US012670316B2

(12) United States Patent
Kaufman et al.

(10) Patent No.: US 12,670,316 B2
(45) Date of Patent: Jun. 30, 2026

(54) DEVICE, SYSTEM, AND METHOD OF WEBSITE BUILDING BY UTILIZING DATA LISTS

(71) Applicant: Wix.com Ltd., Tel Aviv (IL)

(72) Inventors: Amit Kaufman, Tel Aviv (IL); Oren Hollander, Rosh Ha'Ayin (IL); Nadav Abrahami, Tel Aviv (IL); Jiri Tobisek, Kfar Vitkin (IL)

(73) Assignee: Wix.com Ltd., Tel Aviv (IL)

( * ) Notice: Subject to any disclaimer, the term of this patent is extended or adjusted under 35 U.S.C. 154(b) by 191 days.

(21) Appl. No.: 18/586,629

(22) Filed: Feb. 26, 2024

(65) Prior Publication Data

US 2024/0202436 A1     Jun. 20, 2024

Related U.S. Application Data

(63) Continuation of application No. 16/780,941, filed on Feb. 4, 2020, now Pat. No. 11,914,949, which is a continuation of application No. 14/207,761, filed on Mar. 13, 2014, now abandoned.

(60) Provisional application No. 61/781,866, filed on Mar. 14, 2013.

(51) Int. Cl.
*G06F 40/186* (2020.01)
*G06F 3/0481* (2022.01)
*G06F 40/103* (2020.01)

(52) U.S. Cl.
CPC .......... *G06F 40/186* (2020.01); *G06F 3/0481* (2013.01); *G06F 40/103* (2020.01)

(58) Field of Classification Search
CPC ... G06F 40/186; G06F 40/103; G06F 40/0481
See application file for complete search history.

(56) References Cited

U.S. PATENT DOCUMENTS

| | | | |
|---|---|---|---|
| 6,100,885 | A | 8/2000 | Donnelly |
| 6,121,964 | A | 9/2000 | Andrew |
| 6,185,587 | B1 | 2/2001 | Bernardo |
| 6,263,352 | B1 | 7/2001 | Cohen |
| 6,304,886 | B1 | 10/2001 | Bernardo |
| 6,515,682 | B1 | 2/2003 | Washington |

(Continued)

FOREIGN PATENT DOCUMENTS

| | | |
|---|---|---|
| JP | 2002537602 | 11/2002 |
| JP | 2007293662 | 8/2007 |

(Continued)

OTHER PUBLICATIONS

International Search Report for corresponding PCT application PCT/IB2014/059724 mailed on Aug. 19, 2014.

(Continued)

*Primary Examiner* — Mahelet Shiberou
(74) *Attorney, Agent, or Firm* — Heidi Brun Associates Ltd.; Heidi M. Brun

(57) ABSTRACT

Method and system for media navigation. The description hierarchy is accessed. The description hierarchy includes at least one category list. One or more media descriptions are accessed for a plurality of media items. Multiple media items are accessible from multiple sources. One or more media descriptions are mapped to at least one category list. Navigation is processed through a user interface to allow selection of multiple media items from multiple sources.

16 Claims, 28 Drawing Sheets

(56) References Cited

U.S. PATENT DOCUMENTS

| | | | |
|---|---|---|---|
| 6,684,369 B1 | 1/2004 | Bernardo | |
| 7,536,641 B2 | 5/2009 | Rosenstein | |
| 7,761,399 B2 | 7/2010 | Evans | |
| 7,917,859 B1 | 3/2011 | Singh | |
| 8,151,194 B1 | 4/2012 | Chan | |
| 8,224,851 B2 | 7/2012 | Banda | |
| 8,504,932 B2 | 8/2013 | Quek | |
| 9,038,014 B2 | 5/2015 | Sivaramakrishnan | |
| 9,087,035 B1 | 7/2015 | Bandaru | |
| 9,286,273 B1 | 3/2016 | Bobykin | |
| 9,977,472 B2 * | 5/2018 | Huhtala | G06F 3/017 |
| 10,725,610 B2 * | 7/2020 | Bastide | G06F 3/0481 |
| 10,747,951 B2 | 8/2020 | Zhai | |
| 11,914,949 B2 | 2/2024 | Kaufman | |
| 2002/0158902 A1 | 10/2002 | Hooker | |
| 2003/0033370 A1 | 2/2003 | Trotta | |
| 2003/0084055 A1 | 5/2003 | Tanaka | |
| 2003/0105682 A1 | 6/2003 | Dicker | |
| 2004/0039795 A1 | 2/2004 | Percival | |
| 2004/0216084 A1 | 10/2004 | Brown | |
| 2006/0200336 A1 | 9/2006 | Cipollone | |
| 2006/0224553 A1 | 10/2006 | Chtcherbatchenko | |
| 2007/0185927 A1 | 8/2007 | Chess | |
| 2008/0034279 A1 | 2/2008 | Kumar | |
| 2008/0040303 A1 | 2/2008 | Fogelson | |
| 2008/0319950 A1 | 12/2008 | Lasa | |
| 2009/0016086 A1 | 1/2009 | Huynh | |
| 2009/0160861 A1 | 6/2009 | Nakano | |
| 2009/0249193 A1 | 10/2009 | Hanechak | |
| 2009/0276695 A1 | 11/2009 | Hodges | |
| 2009/0276709 A1 | 11/2009 | Venneman | |
| 2009/0300656 A1 | 12/2009 | Bosworth | |
| 2010/0036856 A1 | 2/2010 | Portilla | |
| 2010/0299586 A1 | 11/2010 | Yoo | |
| 2011/0025853 A1 | 2/2011 | Richardson | |
| 2011/0258534 A1 | 10/2011 | Young | |
| 2012/0117453 A1 | 5/2012 | Mackinlay | |
| 2012/0272141 A1 | 10/2012 | Hanechak | |
| 2012/0278704 A1 | 11/2012 | Ying | |
| 2013/0031470 A1 | 1/2013 | Daly, Jr. | |
| 2013/0055071 A1 | 2/2013 | Bray | |
| 2013/0117657 A1 | 5/2013 | Verlaan | |
| 2013/0198679 A1 | 8/2013 | Nurse | |
| 2013/0219263 A1 | 8/2013 | Abrahami | |
| 2014/0040724 A1 | 2/2014 | Krueger | |
| 2014/0129924 A1 | 5/2014 | Le Bescond De Coatpont | |
| 2014/0173563 A1 | 6/2014 | Dias | |
| 2014/0196069 A1 | 7/2014 | Ahmed | |
| 2014/0201027 A1 | 7/2014 | Bhardwaj | |
| 2014/0258841 A1 | 9/2014 | Strong | |
| 2014/0258842 A1 | 9/2014 | Strong | |
| 2015/0127659 A1 | 5/2015 | Madhani | |
| 2015/0278166 A1 | 10/2015 | Hanechak | |
| 2016/0275068 A1 | 9/2016 | Wenzel | |

FOREIGN PATENT DOCUMENTS

| | | |
|---|---|---|
| JP | 2009146186 | 7/2009 |
| JP | 2009529753 | 8/2009 |
| JP | 2012104949 | 5/2012 |
| RU | 2305314 | 8/2007 |
| WO | 2002086704 | 10/2002 |
| WO | 2007103583 A2 | 9/2007 |
| WO | 2011140278 A1 | 11/2011 |
| WO | 2012006567 | 1/2012 |

OTHER PUBLICATIONS

Supplementary Search Report for corresponding European application 14 76 3037 mailed on Nov. 4, 2016.

Vladimir Tkachenko. "Sozdanie veb-stranits i saita" (Creation of web pages and a site) Sep. 25, 2011 <https://www.lessons-tva.info/articles/net/002.html>.

Microsoft, Using the UpDown Control, Jun. 22, 2011, pp. 1-3.

* cited by examiner

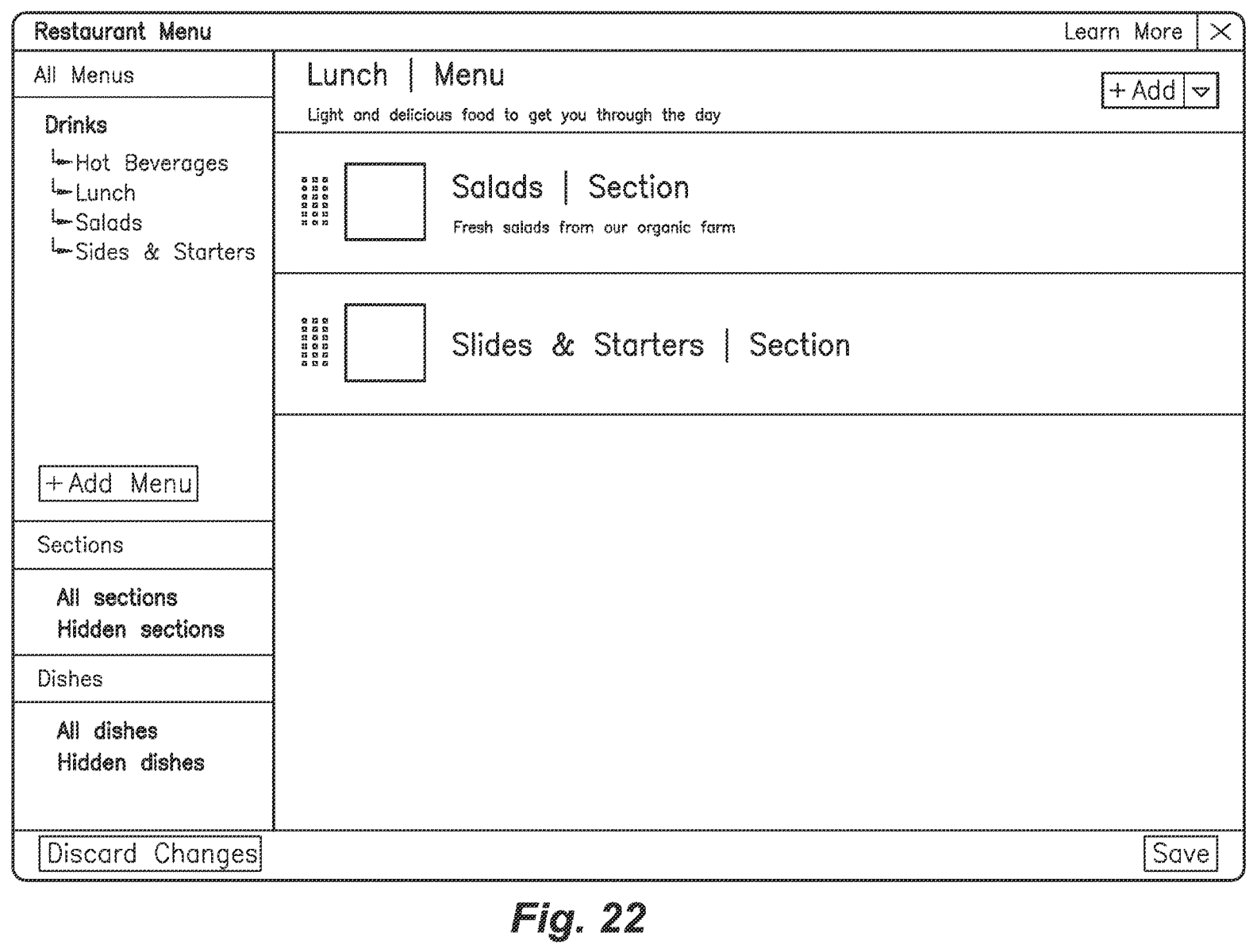

Restaurant Menu

Learn More    ✕

All Menus

Lunch | Menu    + Add ▽

Light and delicious food to get you through the day

Drinks
└Hot Beverages
└Lunch
└Salads
└Sides & Starters

Salads | Section

Fresh salads from our organic farm

Slides & Starters | Section

+ Add Menu

Sections

All sections
Hidden sections

Dishes

All dishes
Hidden dishes

Discard Changes    Save

*Fig. 22*

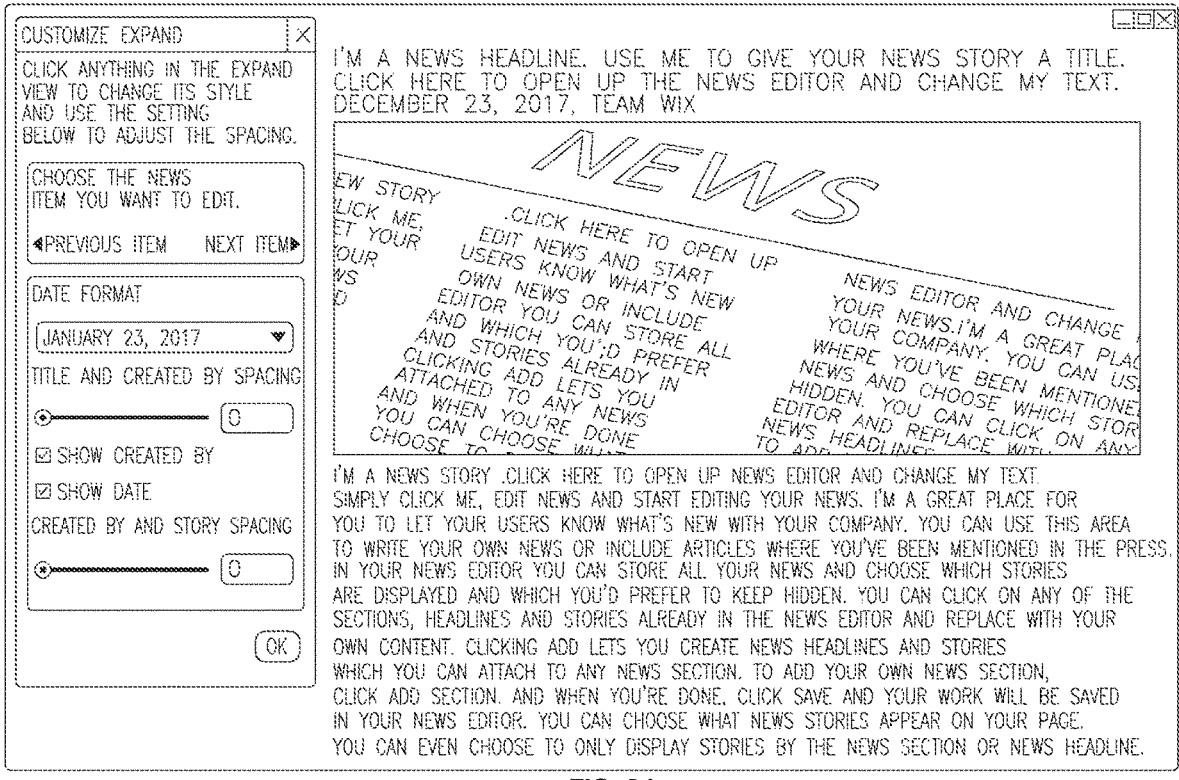

CUSTOMIZE EXPAND                    ✕

CLICK ANYTHING IN THE EXPAND
VIEW TO CHANGE ITS STYLE
AND USE THE SETTING
BELOW TO ADJUST THE SPACING.

CHOOSE THE NEWS
ITEM YOU WANT TO EDIT.

◀PREVIOUS ITEM    NEXT ITEM▶

DATE FORMAT

JANUARY 23, 2017            ▼

TITLE AND CREATED BY SPACING

●━━━━━━━━━━━  [ 0 ]

☑ SHOW CREATED BY

☑ SHOW DATE

CREATED BY AND STORY SPACING

●━━━━━━━━━━━  [ 0 ]

( OK )

I'M A NEWS HEADLINE. USE ME TO GIVE YOUR NEWS STORY A TITLE.
CLICK HERE TO OPEN UP THE NEWS EDITOR AND CHANGE MY TEXT.
DECEMBER 23, 2017, TEAM WIX

I'M A NEWS STORY. CLICK HERE TO OPEN UP NEWS EDITOR AND CHANGE MY TEXT.
SIMPLY CLICK ME, EDIT NEWS AND START EDITING YOUR NEWS. I'M A GREAT PLACE FOR
YOU TO LET YOUR USERS KNOW WHAT'S NEW WITH YOUR COMPANY. YOU CAN USE THIS AREA
TO WRITE YOUR OWN NEWS OR INCLUDE ARTICLES WHERE YOU'VE BEEN MENTIONED IN THE PRESS.
IN YOUR NEWS EDITOR YOU CAN STORE ALL YOUR NEWS AND CHOOSE WHICH STORIES
ARE DISPLAYED AND WHICH YOU'D PREFER TO KEEP HIDDEN. YOU CAN CLICK ON ANY OF THE
SECTIONS, HEADLINES AND STORIES ALREADY IN THE NEWS EDITOR AND REPLACE WITH YOUR
OWN CONTENT. CLICKING ADD LETS YOU CREATE NEWS HEADLINES AND STORIES
WHICH YOU CAN ATTACH TO ANY NEWS SECTION. TO ADD YOUR OWN NEWS SECTION,
CLICK ADD SECTION. AND WHEN YOU'RE DONE, CLICK SAVE AND YOUR WORK WILL BE SAVED
IN YOUR NEWS EDITOR. YOU CAN CHOOSE WHAT NEWS STORIES APPEAR ON YOUR PAGE.
YOU CAN EVEN CHOOSE TO ONLY DISPLAY STORIES BY THE NEWS SECTION OR NEWS HEADLINE.

*FIG. 24*

Restaurant Menu   ⑦   ✕

Change the design of your menu and try out the different menu layouts. To add new items to your menu, click Edit Menus.

| Choose Menu ≫ |
| Edit Menu ≫ |

Choose Layout

Language Direction

B

☑ Show dish price
☐ Show section separator    C

Transition

| none ▽ |

Columns
| 120 |

Rows
| 120 |

Gallery height
| 120 |

| ☐ Show on all pages     ? | x 217   y 33     w 400   h 665

*Fig. 25*

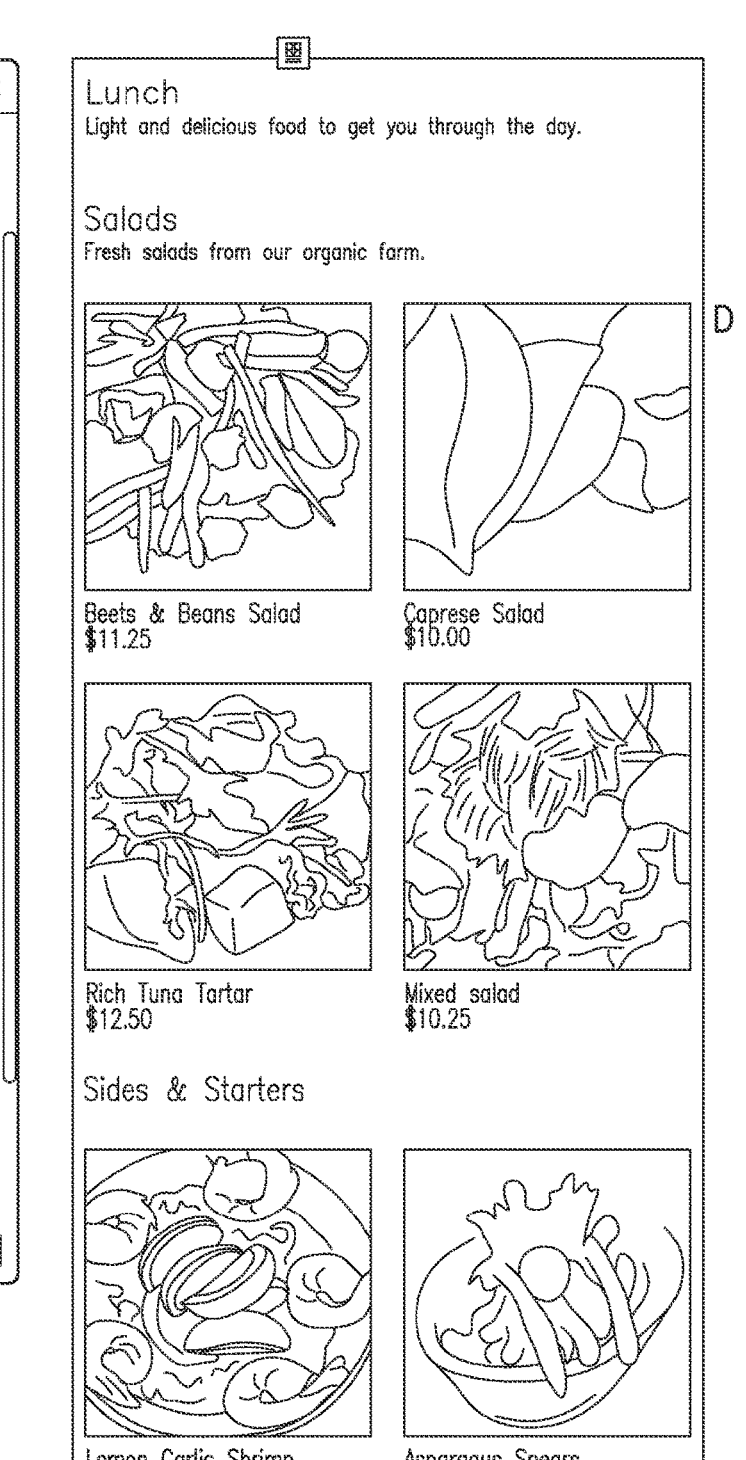

Lunch
Light and delicious food to get you through the day.

Salads
Fresh salads from our organic farm.

D

Beets & Beans Salad
$11.25

Caprese Salad
$10.00

Rich Tuna Tartar
$12.50

Mixed salad
$10.25

Sides & Starters

Lemon Garlic Shrimp

Asparagus Spears

DEVICE, SYSTEM, AND METHOD OF WEBSITE BUILDING BY UTILIZING DATA LISTS

CROSS-REFERENCE TO RELATED APPLICATIONS

This application is a continuation application of U.S. patent application Ser. No. 16/780,941, filed Feb. 4, 2020, which is a continuation of U.S. patent application Ser. No. 14/207,761 filed Mar. 13, 2014, which claims priority from U.S. Provisional Patent Application 61/781,866, filed on Mar. 14, 2013, all of which are incorporated herein by reference.

FIELD OF THE INVENTION

The present invention relates to the field of building websites.

BACKGROUND

Millions of users utilize the Internet every day, in order to read or otherwise consume web content. For example, a user may utilize a personal computer, a laptop computer, a Smartphone or a tablet, typically running a browser, in order to read online news, watch online videos, interact with other users through social networks, play online games, or the like.

Some websites may be built by manually writing code, particularly HTML code and/or JavaScript. However, as websites became more sophisticated and offered a richer and interactive user experience, various "website builder" tools were introduced in order to facilitate and/or automate the constructions of particular web-pages and even entire web-sites.

SUMMARY

There is provided, in accordance with a preferred embodiment of the present invention, a website building system (WBS) including a content database storing a pool of content items to be displayed on a website being built; a view database storing a set of views which can be used to display the items, each view being a template for a section of a web page of the website; a view pool searcher to execute a search query on the view database for one or more views that match a given set of content items stored in the content database according to at least one of keywords, attributes, fields and applications of the given set and a dynamic matching and adaptation module to dynamically provide an appropriate view from among the views found by the view pool searcher for each set of content items for displaying the content items on the website, the appropriate view selected based on a priority value.

Moreover, in accordance with a preferred embodiment of the present invention, the dynamic matching and adaptation module performs at least one of: constructing a matching view on-the-fly and modifying the located view from the view pool searcher.

Further, in accordance with a preferred embodiment of the present invention, the WBS supports item types, where at least one view in the set of views is associated with an item type and can be used to display items belonging to the item type.

Still further, in accordance with a preferred embodiment of the present invention, the WBS supports inheritance of views through a view inheritance module able to generate a derived view that inherits characteristics from an existing view.

Additionally, in accordance with a preferred embodiment of the present invention, the WBS further includes a parent view searcher to search upwardly for a suitable view in a view inheritance tree, if a given view is not suitable for a given content.

Moreover, in accordance with a preferred embodiment of the present invention, the WBS includes ranking module to rank potential matching views for a given content item.

Further, in accordance with a preferred embodiment of the present invention, the WBS includes a view priority manager to attach the priority value to each view; where the dynamic matching module is to find multiple candidate matching views, and to select from the multiple candidate matching view a single view for utilization based on the priority value.

Still further, in accordance with a preferred embodiment of the present invention, the matching and adaptation module includes a dynamic view constructor to dynamically modify a top-ranking candidate among multiple candidate matching views, for a given content item, if the matching and adaptation module does not find any matching pre-defined view that matches the content item with a matching score that is greater than a threshold value.

Additionally, in accordance with a preferred embodiment of the present invention, the WBS includes a specific item adaptation module to adapt a specific content item by performing at least one of: adding one or more components to a displayed content in a context of a specific view being applied; deleting one or more components of a displayed content in a context of a specific view being applied; and modifying one or more components of a displayed content in a context of a specific view being applied.

Moreover, in accordance with a preferred embodiment of the present invention, the specific item adaptation module includes a local variant creator to create a local variant of a given view as an internal derived view, and to add a layer of modifications to the internal derived view.

Further, in accordance with a preferred embodiment of the present invention, one or more content items include one or more of: a view; a template; an item type; a collection of items; a list application; a linking component.

There is provided, in accordance with a preferred embodiment of the present invention, a computerized method for building a website, the method includes storing in a content database a pool of content items to be displayed on a website being built; storing in a view database a set of views which can be used to display the items, each view being a template for a section of a web page of the website; executing a search query on the view database for one or more views that match a given set of content items stored in the content database according to at least one of keywords, attributes, fields and applications of the given set and dynamically providing an appropriate view from among the views found by the executing a search query on the view database for each set of content items for displaying the content items on the website based on a priority value.

Moreover, in accordance with a preferred embodiment of the present invention, the method includes performing at least one of: constructing a matching view on-the-fly and modifying the located view from the executing a search query.

Further, in accordance with a preferred embodiment of the present invention, the method includes associating between a given view and a given item; where the dynamically providing an appropriate view comprises performing dynamic matching based on pre-association between views and items.

Still further, in accordance with a preferred embodiment of the present invention, the method further includes supporting inheritance of views by generating a derived view that inherits characteristics from an existing view.

Additionally, in accordance with a preferred embodiment of the present invention, the method further comprises ranking potential matching views for a given content item.

Moreover, in accordance with a preferred embodiment of the present invention, the dynamically providing an appropriate view comprises dynamically modifying a top-ranking candidate among multiple candidate matching views, for a given content item, if the dynamically providing an appropriate view does not find any matching pre-defined view that matches the content item with a matching score that is greater than a threshold value.

Further, in accordance with a preferred embodiment of the present invention, the method includes applying one or more dynamic layout rules to the particular view.

Still further, in accordance with a preferred embodiment of the present invention, the method includes defining a linking component including a container that displays content obtained from the pool of content items.

Additionally, in accordance with a preferred embodiment of the present invention, the method further includes performing specific item adaptation to adapt a specific content item by performing at least one of: adding one or more components to a displayed content in a context of a specific view being applied; deleting one or more components of a displayed content in a context of a specific view being applied and modifying one or more components of a displayed content in a context of a specific view being applied.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 22 is a demonstrative User Interface (UI) which supports explicit collection updating for a restaurant List Application (LA), in accordance with some demonstrative embodiments of the present invention;

FIG. 24 is a sample LC displaying a single expanded item, in accordance with some demonstrative embodiments of the present invention;

FIG. 25 is a sample LC displaying multiple item views in a multi-column gallery style format, in accordance with some demonstrative embodiments of the present invention;

DETAILED DESCRIPTION OF THE PRESENT INVENTION

In the following detailed description, numerous specific details are set forth in order to provide a thorough understanding of some embodiments. However, it may be understood by persons of ordinary skill in the art that some embodiments may be practiced without these specific details. In other instances, well-known methods, procedures, components, units and/or circuits have not been described in detail so as not to obscure the discussion.

The present invention may comprise a website building system (WBS) which may implement list components and list applications as described herein. The WBS may be used by a designer or programmer or other person who desires to build a website. Some implementations of the WBS may be configured to be suitable for novice users or laymen users, or for website creators who do not necessarily have advanced skills (or any skills) in programming, and who may not necessarily be proficient in programming language(s). A direct user of the WBS, who may utilize the WBS for creating a website, may be referred to as a "designer"; whereas the website itself, once it is built and published, may be used by "end-user(s)".

In accordance with the present invention, the WBS may comprise and/or enable the following features: Items and item collections; Item types; Views (including conditional, calculated and other elements); Templates and inheritance (including derived views and derived types); Linking Components (LC's); Dynamic matching between items, types and views; Support for automatic creation of item types based on derived views, and vice versa; Support for customizations and automatically generated customization dialogs; Support for specific item adaptations; Support for the creation of connections between related LC's; Support for application store integration for all the above features.

Some embodiments of the present invention may be utilized in conjunction with systems, methods, modules and/or components which are described in U.S. patent application Ser. No. 13/771,119, titled "Web Site Design System Integrating Dynamic Layout and Dynamic Content", filed on Feb. 20, 2013, published as United States patent application publication number 2013/0219263 which issued as U.S. Pat. No. 10,185,703 on Jan. 22, 2019, which is hereby incorporated by reference in its entirety.

Pages, Containers and Components

Figure 1:
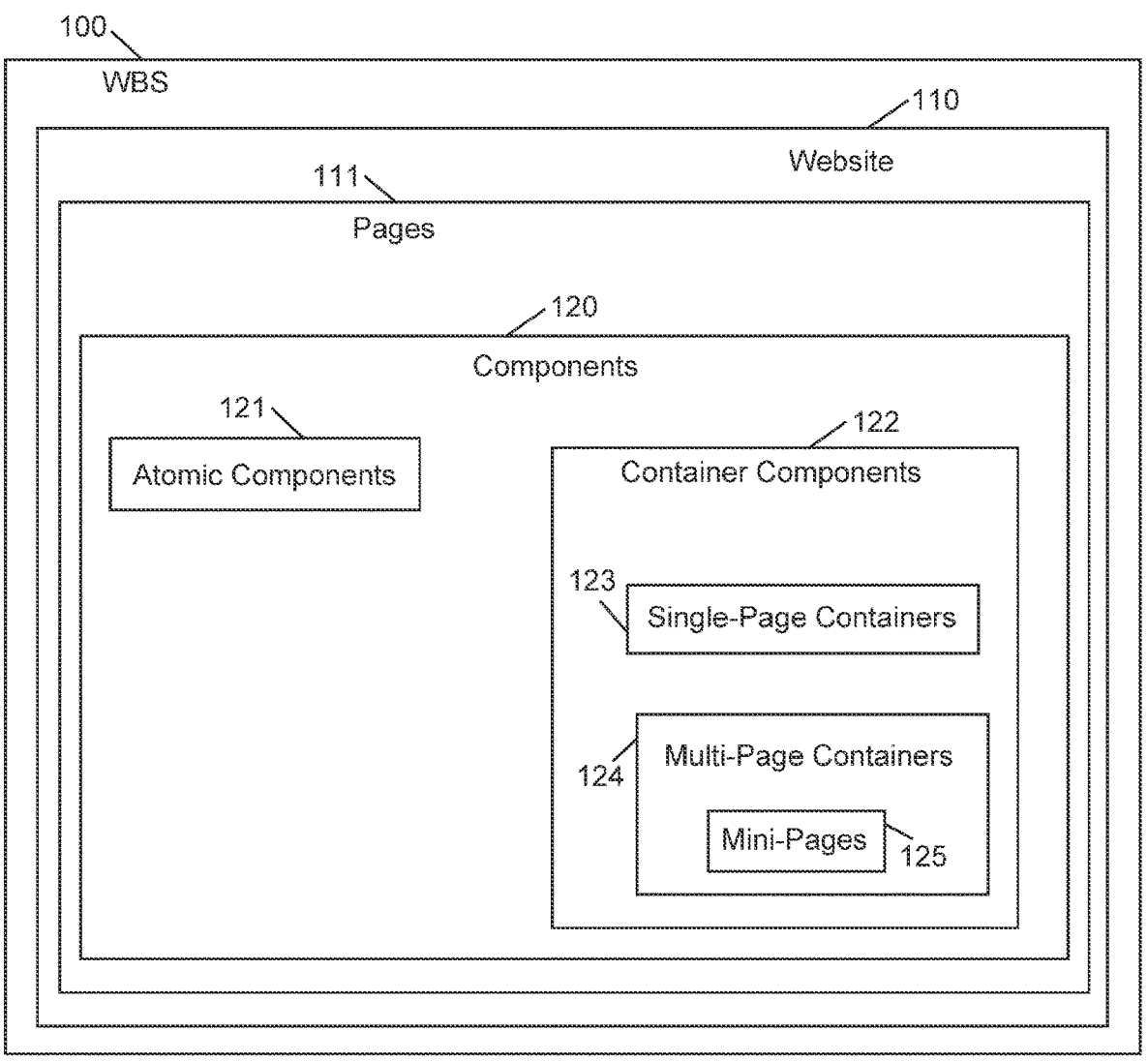
FIG. 1 is a schematic block-diagram illustration of a Website Building System (WBS) which may be used for building a website, in accordance with some demonstrative embodiments of the present invention.

Reference is made to FIG. 1, which is a schematic block-diagram illustration of a Website Building System (WBS) 100 which may be used for building a website 110, in accordance with some demonstrative embodiments of the present invention. WBS 100 may be used to build, produce, edit and/or generate website 110, which may comprise pages 111 which may include components 120 (e.g., text, images, videos).

Components 120 may be, for example, atomic components 121 and/or container components 122. For example, container components 122 may be single-page containers 123 or multi-page containers 124 (which include multiple mini-pages 125 separate from each other). It is clarified that these are only non-limiting, demonstrative examples. In particular, FIG. 1 demonstrates a specific configuration of components and containers, but numerous such configurations are possible.

Multi-page containers 124 may display a single mini-page 125 at a time (single page display), or may display some or all of the mini-pages 125 (e.g., implemented as a gallery or carousel or collection display, for example, as demonstrated in FIG. 25). A multi-page container 124 may have a fixed display mode (e.g., gallery display only), or may allow the user to switch among multiple display modes.

When viewing a page containing a multi-page container 124, the user may step between the various mini-pages 125 contained in the given multi-page container 124 using one or more suitable mechanisms, for example, navigation buttons (e.g., first, previous, next, last) and/or visual selection among multiple visible mini-pages 125 (or their thumbnails, scaled-down representations).

Figure 2:
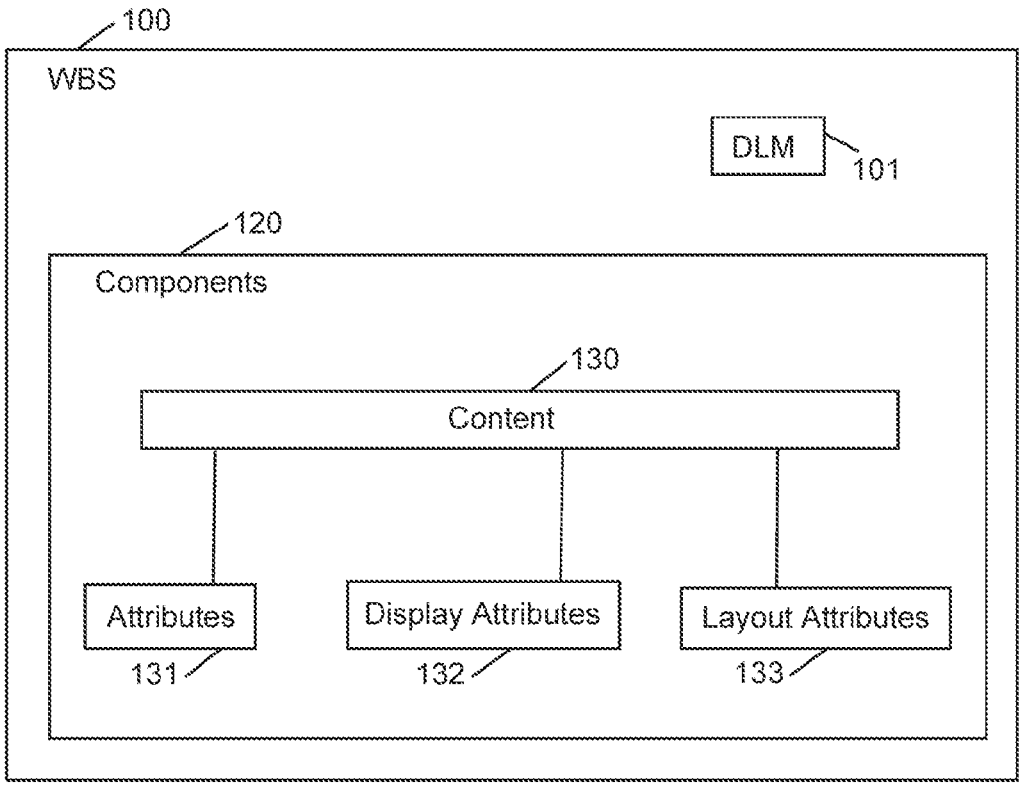
FIG. 2 is a schematic block-diagram illustration of the WBS showing in particular components and their content, in accordance with some demonstrative embodiments of the present invention.

Reference is made to FIG. 2, which is a schematic block-diagram illustration of WBS 100 showing in particular components 120 (e.g., of page 111 of website 110) and their content 130, in accordance with some demonstrative embodiments of the present invention.

Components 120 may have content 130, for example, text content for text component, an image for image component, video content for a video player component, or the like. Components 120 may have (or may be associated with) attributes 131, for example, display attributes 132 (e.g., color, frames) and layout attributes 133 (e.g., size and position). It is clarified that FIG. 2 depicts a non-limiting, demonstrative implementation; and that the various attributes 131, 132 and/or 133 may not necessarily "depend" on content 130. For example, some of the components in WBS 100 may have (or may be associated with) attributes 131, 132 and/or 133, without necessarily having content 130. Similarly, in some component types, attributes 131, 132 and/or 133 may be entirely separate of (and/or independent from) a particular content or any content. In other component types, content may be associated with attributes; for example, one or more specific font types and/or colors may be associated with elements of text that are shown in a text component.

The WBS 100 may generate a page definition which may include dynamic layout rules (e.g., anchors connecting multiple component edges) which may be handled by a Dynamic Layout Manager (DLM) 101. For example, DLM 101 may be activated whenever a dynamic layout (DL) trigger is activated, e.g., a change which affects the page layout (for example, adding components, removing components, changing a component's content in a way which affects component size, moving components, resizing components), content change for components which reflect external content, or the like. Other suitable triggers or triggering mechanisms may be used, for example, as detailed in the above-mentioned U.S. Pat. No. 10,185,703.

Inheritance Relationships

Figure 3:
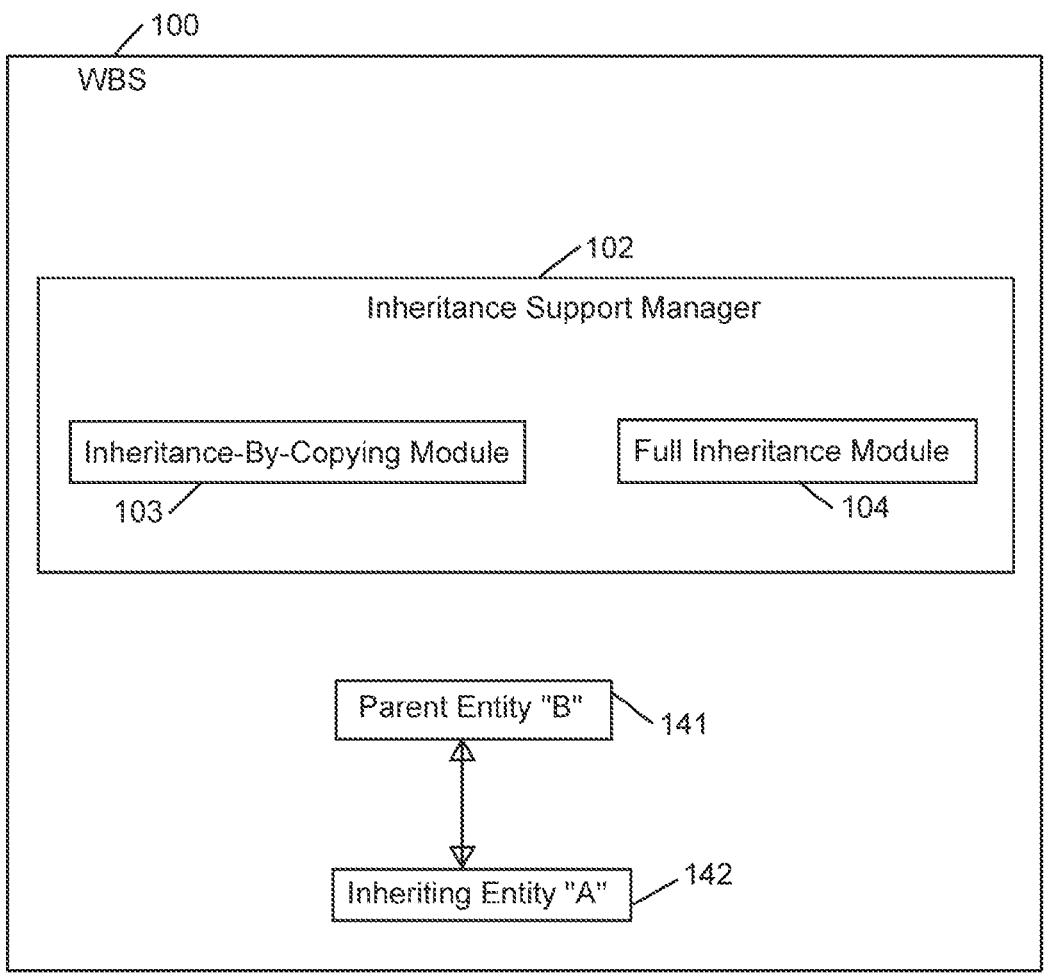
FIG. 3 is a schematic block-diagram illustration of the WBS demonstrating in particular inheritance among objects, in accordance with some demonstrative embodiments of the present invention.

Reference is made to FIG. 3, which is a schematic block-diagram illustration of WBS 100 demonstrating in particular inheritance among objects, in accordance with some demonstrative embodiments of the present invention. WBS 100 may comprise an inheritance support manager 102 able to support inheritance relationship between entities of a given entity type, including in particular the following entity types: Templates (which may include pages), Item types and Views.

When an entity A inherits from an entity B, the sub-elements of A are copied or imported from the sub-entities of B. For example, entity B may be referred to as "parent entity B" (denoted 141); whereas entity A may be referred to as "child entity A" or "inheriting entity A" (denoted 142). It is noted that entity A may include local modifications to the sub-elements copied over from B, including (without limitation): Addition of new sub-elements; Removal of copied sub-elements; Changes to properties of copied sub-elements. The local modifications would only apply to the inheriting entity A and not to the parent entity B.

Inheritance support manager 102 may comprise, or may utilize, or may be associated with, one or more inheritance-enabling modules, for example, an inheritance-by-copying module 103 and/or a full inheritance module 104 (which may also be referred to as a "continuous inheritance" module, since the inheritance linkage may continuously affect the inheriting entity A when subsequent modifications are made to the parent entity B). It is noted that in some implementations, WBS 100 may support only inheritance-by-copying; whereas in other implementations, WBS 100 may support only full inheritance. Accordingly, in some implementations, WBS 100 may support either full inheritance or inheritance-by-copying, but not both of them.

Inheritance-by-copying module 103 may enable inheritance by copying, such that entity A is a separate entity created based on parent entity B by copying its structure and sub-elements. However, the copy is a separate entity and would not reflect changes that are made to parent entity B after the creation of inheriting entity A.

Full inheritance module 104 may enable full inheritance, such that the inherited entity A remains (even when modified) an instance of parent entity B. For example, if parent entity B is modified after inheriting entity A was created, the changes made to parent entity B would automatically be reflected in inheriting entity A and would be combined with the local modifications made to inheriting entity A.

Inheritance support manager 102 and/or its modules may support (for each inheritance-supporting entity type) any of the following inheritance types, or a combination thereof: (a) Regular inheritance, such that A inherits from B; (b) Multi-level inheritance, such that A inherits from B, and B inherits from C; (c) Multiple inheritance, such that A inherits from both B and C, combining sub-elements from both; (d) Diamond inheritance, such that A inherits from both B and C, and both B and C inherit from another entity D.

Templates

Figure 4:
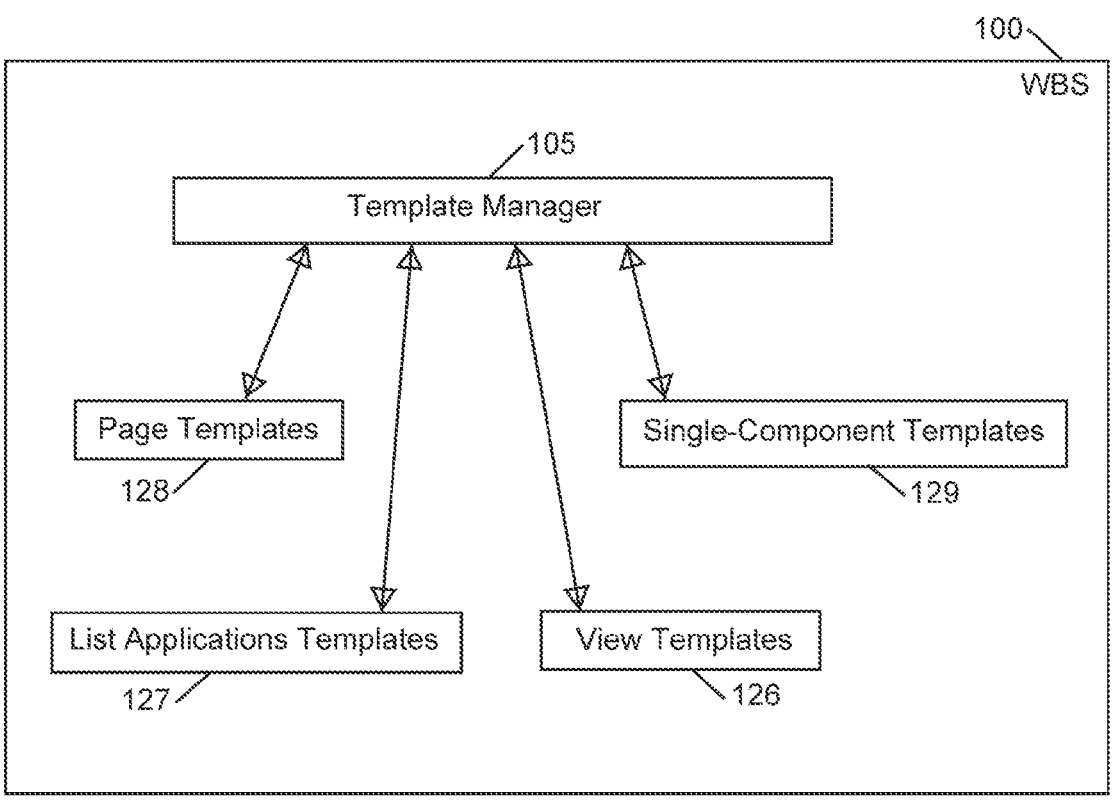
FIG. 4 is a schematic block-diagram illustration of the WBS demonstrating in particular templates, in accordance with some demonstrative embodiments of the present invention.

Reference is made to FIG. 4, which is a schematic block-diagram illustration of WBS 100 demonstrating in particular templates, in accordance with some demonstrative embodiments of the present invention. WBS 100 may comprise a template manager 105 able to manage page templates 128. For example, a template 128 may be a special type of page (or mini-page) which is not a part of the regular website being edited. Templates 128 may be embedded in regular pages, and may be added to the content of such pages; additionally or alternatively, templates 128 may be used as foundation for the creation of new pages. In some embodiments, both of these functionalities of templates 128 may be implemented by defining a page which inherits from a specific template. Optionally, a page may include multiple templates, which may all be combined together with the pages' content.

WBS 100 may further support single-component templates 129, which describe the properties of a single component, and may be used when constructing other templates and pages. It is noted that page templates 128 may be viewed as multiple component templates with additional page-level properties (e.g., dynamic layout anchors).

In some implementations, WBS 100 may enable or may support the following template types: Page templates 128; Single-component templates 129; List application templates 127; and View templates 126. It is noted that the various types of templates that are described above for demonstrative purposes, relate to objects which may have vastly different scope and/or complexity and/or characteristics. For example, list application templates may describe a complete application environment or substantial portion thereof, such as a turnkey restaurant site (e.g., as demonstrated in FIG. 21), a turnkey news reporting website, or the like. As such, a list application template may include a multiplicity of item types, items, collections, views and pages—all of which are used to create or generate the actual website.

Optionally, WBS 100 may support or enable inheritance relationships between templates, such that modified templates may be derived from base templates. This feature of the present invention may be in addition to the inheritance relationship between pages and templates (e.g., a particular page inheriting from one or more templates).

Item Types

Figure 5:
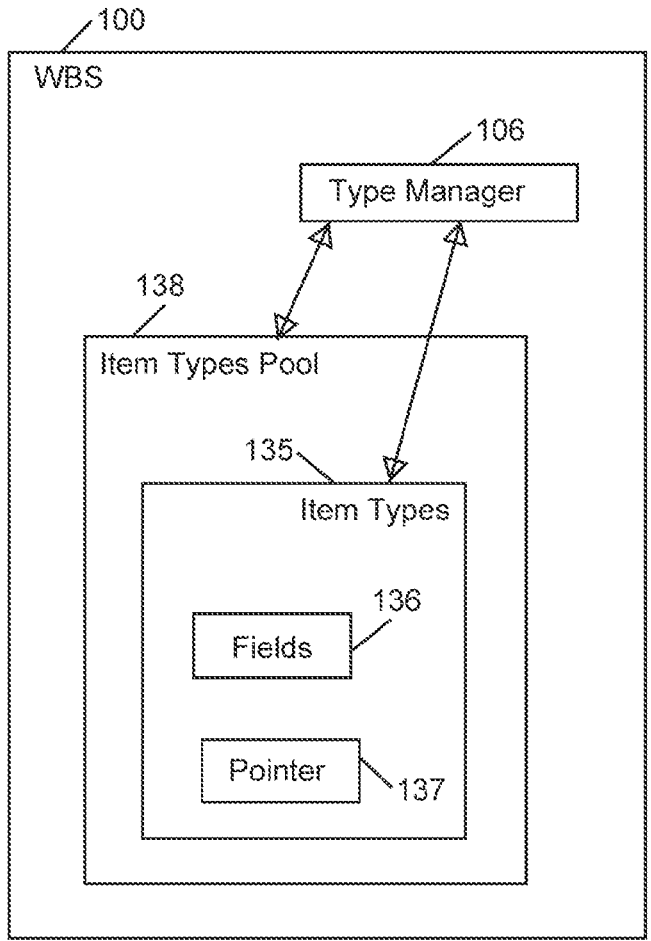
FIG. 5 is a schematic block-diagram illustration of the WBS demonstrating in particular item types, in accordance with some demonstrative embodiments of the present invention.

Reference is made to FIG. 5, which is a schematic block-diagram illustration of WBS 100 demonstrating in particular item types, in accordance with some demonstrative embodiments of the present invention. WBS 100 may comprise a Type Manager 106, able to manage "types" or Item types 135, which may be data record definitions that describe items (e.g., item schemas). For example, a demonstrative item type 135 may comprise a set of fields 136 (e.g., text, number, image). Optionally, one possible field type is a pointer 137 to an item (or set of items), which may be used to create item hierarchies (through pointer to parent), item chains (through pointer to next item), or other inter-item relation among two or more items. Yet another possible field type is a set of tags (selected from a list of tags for the given field), used to mark items for retrieval via a tag-cloud like mechanism.

An item type 135 may inherit from other item types 135, optionally with additions, deletions and modifications applied to them. For example, a "shirt" item type may inherit from a "garment" item type, and may have the additional field "sleeves (short/long)".

The pool of item types 135 may be defined at the collection level, application level, designer level, or WBS level. Optionally, WBS 100 may support one or more item type pool(s) 138, at one or more suitable levels.

Collections and Items

Figure 6:
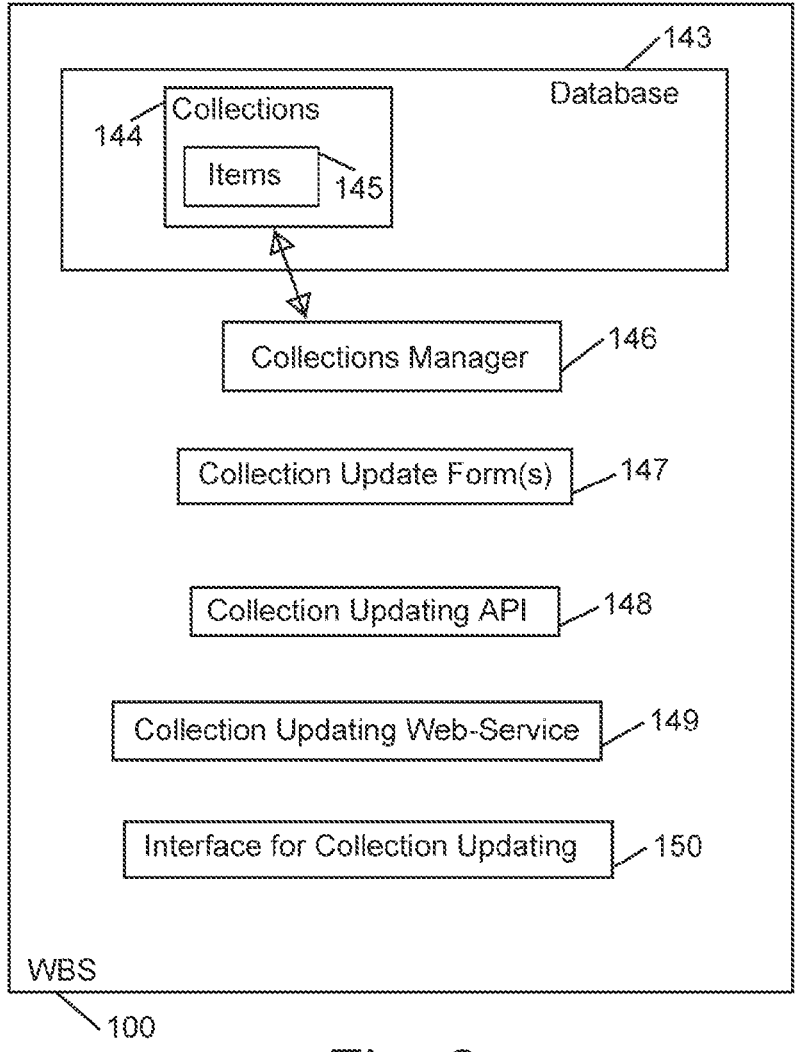
FIG. 6 is a schematic block-diagram illustration of the WBS demonstrating in particular collections and items, in accordance with some demonstrative embodiments of the present invention.

Reference is made to FIG. 6, which is a schematic block-diagram illustration of WBS 100 demonstrating in particular collections and items, in accordance with some demonstrative embodiments of the present invention. WBS 100 may comprise, or may be associated with, a back-end database 143 which may include one or more collections 144 of items 145. Each collection 144 may comprise one or more items 145. Each item 145 may be associated with a specific item type 135. A collection may be uniform (e.g., all the items of that collection have the same item type); or non-uniform (e.g., at least two of the items in that collection have two different item types). It is noted that FIG. 6 depicts, for demonstrative purposes, that database 143 comprises both collections 144 and items 145. In some implementations, collection and item(s) may have hierarchy relationships, since a collection comprises items.

Collection Updating

Collections 144 of items 145 may be updated, for example, by adding items 145, deleting items 145, and/or modifying items 145. For example, WBS 100 may optionally comprise a Collections Manager 146 able to provide automatically-generated screens which may be used by users (e.g., designers, developers, website creators) to update or edit a collection 144; for example, as demonstrated in FIG. 22 which is an example UI which supports collection updating for a restaurant list application (e.g., adding, removing or editing of menus/sections/dishes). Additionally or alternatively, a developer may create his own collection update form(s) 147, and provide them to the end-user for run-time collection updates.

In some implementations, WBS 100 may provide a programmatic interface (e.g. a collection updating API 148) through which the created website may interface directly with the collections manager 146 and update the collection 144. Optionally, WBS may provide an interface (e.g., a collection updating web service 149) allowing an external application (e.g. web application, mobile application, desktop application, cloud-based application, or the like) to access the collection 144 and update it directly, without the need to access the collection 144 through the constructed website. In some implementations, WBS 100 may provide an interface 150 for collection updating based on external data source (e.g., RSS feed) to be attached to a given collection 144, and the WBS itself may be responsible for updating the collection 144 based on the incoming data feed.

Optionally, a collection 144 may be constructed such that it represents (or points to) data present in an external system or data set, for example, as a "virtual collection" 151. In this case, changes in the underlying system or data set would be automatically reflected in the virtual collection 144.

Linking Components

Figure 7:
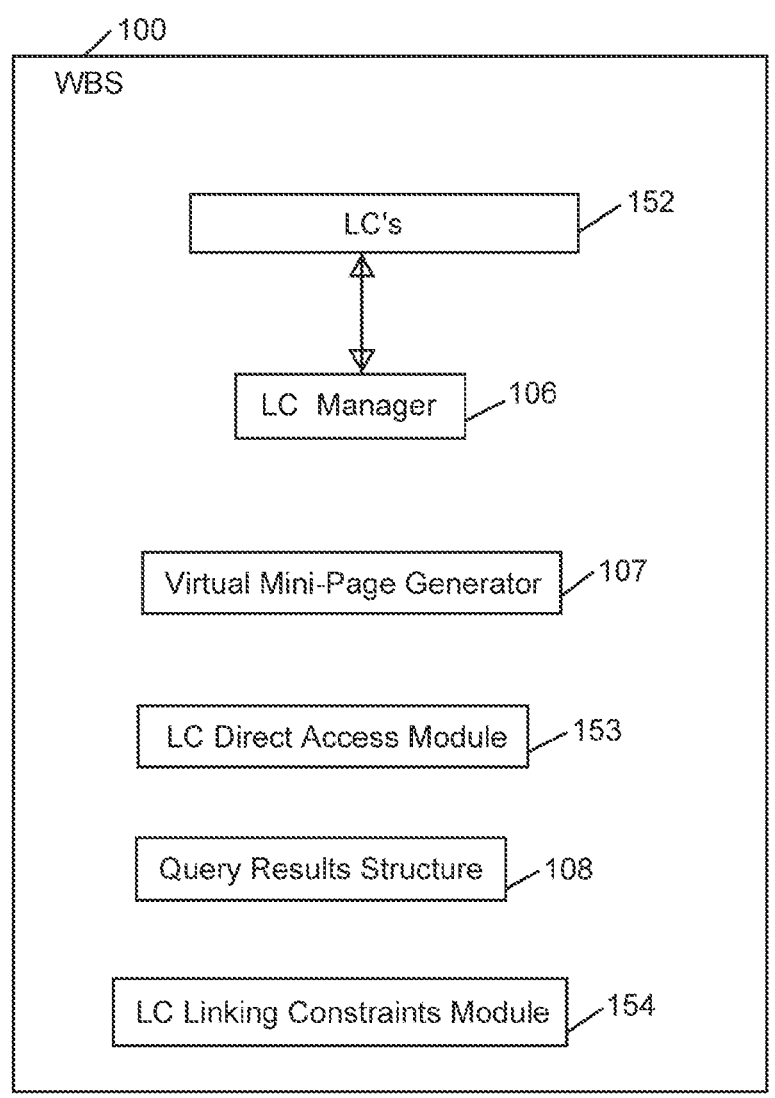
FIG. 7 is a schematic block-diagram illustration of the WBS demonstrating in particular Linking Components (LC's), in accordance with some demonstrative embodiments of the present invention.

Reference is made to FIG. 7, which is a schematic block-diagram illustration of WBS 100 demonstrating in particular Linking Components (LC's) 152, in accordance with some demonstrative embodiments of the present invention. WBS 100 may comprise, or may enable the utilization of, Linking Components (LC's) 152, which may be managed or handled via an LC Manager 106 module. Each LC 152 may be a special type of multi-page container that displays items obtained from one or more collections through view dynamically or statically associated with each item, with each mini-page displaying one item through the associated view. Implementations may support a number of types of LC 152, including: (a) a LC 152 which displays a single mini-page (and the related item and its associated view) at any time; (b) a LC 152 which displays several mini-pages concurrently (e.g., gallery or carousel type container), or may show multiple items through associated view(s) (e.g., such that each view may be displayed in a mini-page). LC's 152 may be used directly (e.g., by their inclusion in pages or mini-pages), or through templates containing them (e.g., like other components which may be included in templates). A single page or mini-page may contain multiple LC's 152.

Optionally, an LC may be associated with: a specific item directly; or a single collection of items; or a set of collections (e.g., which may be displayed one after the other or hierarchically using a table-of-content like structure). For example (as demonstrated in FIG. 23), a restaurant List Application (LA) may use a menu LC which displays the hierarchical menu organization—thereby displaying items from the "menus" collection (e.g., the current menu name), the "sections" collection (e.g., menu section names such as "Salads", "Sides and starters" etc.) and the "dishes" collection (e.g., names and prices of specific dishes). Such LC's may be referred to herein as Composite LC's.

In some implementations, a virtual mini-page generator 107 may automatically generate a virtual mini-page for each item in the one or more collection(s) associated with an LC 152. It is clarified that a single LC 152 may be associated with multiple collections, some of which may be virtual and some may not. When an LC 152 is displayed, designers and users may manually navigate between the multiple displayed mini-pages of that LC, for example, by using a scroll bar or navigation buttons (e.g., First, Previous, Next, Last). The designers and users may also perform additional operations, as detailed herein.

In accordance with the present invention, WBS 100 may comprise a LC direct access module 153 which may enable direct linking to an LC 152; for example, allowing a page containing LC(s) to be directly accessed using a URL. Such demonstrative direct URL's may be, for example:

www.MySite.com/prefix/MyPage.html?MyItem
www.MySite.com/prefix/
    MyPage.html?LC1=MyItem1&LC2=MyItem2
www.MySite.com/prefix/
    MyPage.html?LC1=MyFilterQueryString The use of such direct links may cause WBS 100 to open the specific page (containing the LC(s) 152) with the LC(s) 152 already displaying the requested items, or with a given query being used to filter items, similar to the way queries and parameters are added to regular URL's (e.g., to be passed for processing by PHP programs).

When WBS 100 opens a page containing an LC 152, with the LC 152 displaying the result of a URL-originated query, the LC 152 would display the query results as a query results structure 108, which may be detailed or summarized. The result list by itself is not necessarily a page or mini-page, but rather, may have an arbitrary or predefined structure as defined by WBS 100. A detailed result list may optionally include multiple mini-pages (e.g., one mini-page for each result found); this may differ from the regular situation in which an LC 152 displays one or more mini-pages at any time.

Optionally, WBS 100 may be configured to limit such direct linking or deep linking to specific LC's 152, or to specific LC types. For example, an LC linking constraints module 154 may be used for defining constraints or limitations on direct linking to LC's or LC types; and may further be responsible for enforcing such LC linking constraints.

In some implementations, WBS 100 may comprise alternative interfaces (e.g. a web-service based interface, or a message-passing based interface) to access one or more of the functions described above.

WBS 100 may optionally define and utilize specialized LC's 152 for specific uses, for example: Displaying only a filter search box (with the result being displayed elsewhere);

Displaying a result list; Displaying a "tag cloud" or a group of tags which qualify the items in a given collection.

A demonstrative use of LC's 152 may include one or more of the following: (a) The LC 152 is directly associated with (and displays) a single pre-specified top-level item (see FIG. 24); (b) The LC 152 is directly associated with a single pre-specified top-level item, and displays this item together with one or more contained related list(s) (showing related items from the same or different collection—see FIG. 23A); (c) The LC 152 is associated with a filtered collection (with the filter selecting a given set of items from the list), implementing a manual pre-selection of items or an actual dynamic query.

In addition to list navigation (as described above), WBS 100 may enable additional operations which may be activated when a list is displayed in an LC 152, depending on the designer/user permissions and privileges. Such additional operations may include, for example: (a) Go to add item form (e.g., a view used in item adding mode, as described herein); (b) Go to an expanded item page; (c) Go to related list; (d) Go to item editing.

Views

Figure 8:
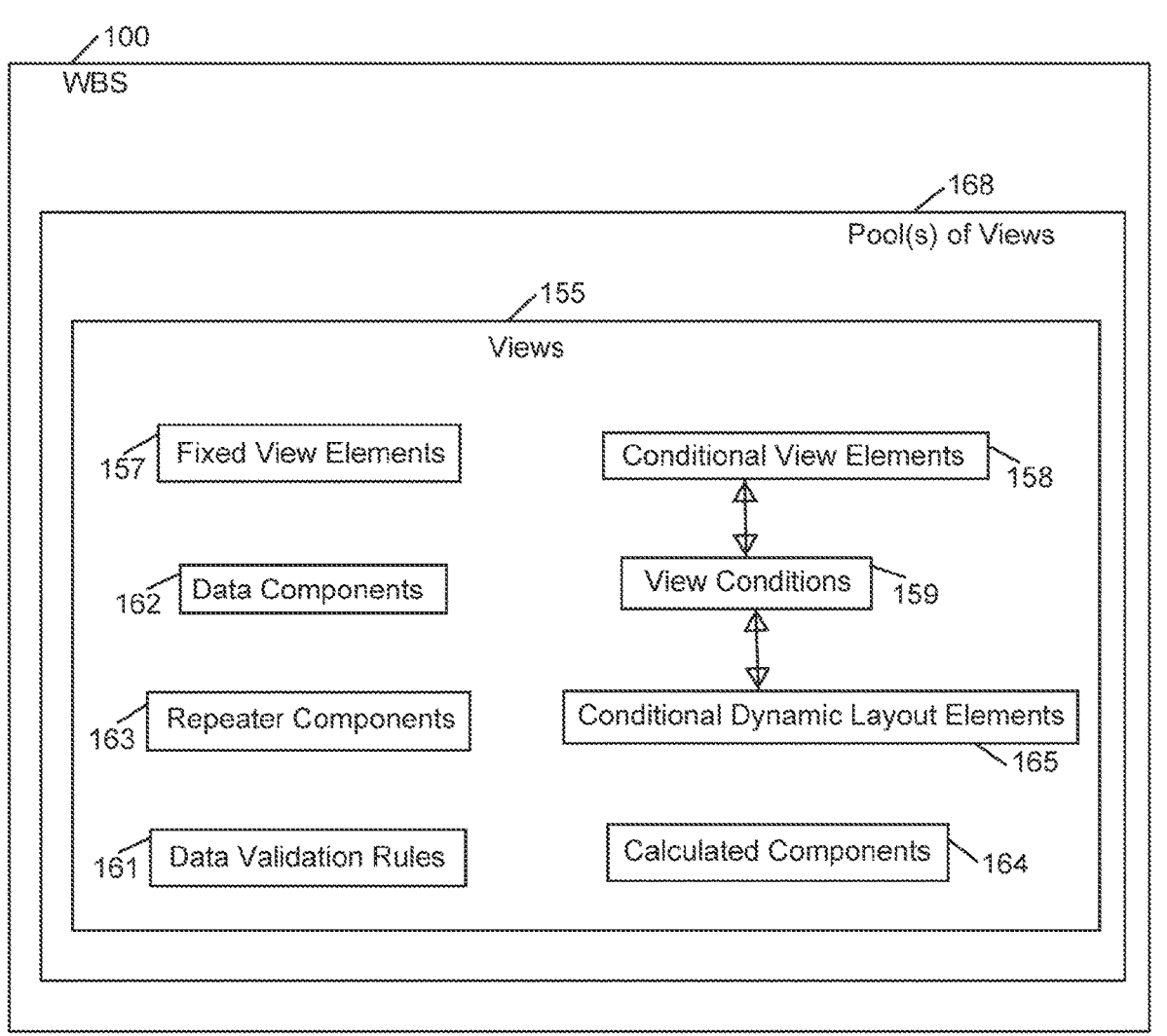
FIGS. 8-9 are schematic block-diagram illustrations of the WBS demonstrating in particular Views and modules that manage such Views, in accordance with some demonstrative embodiments of the present invention.
Figure 9:
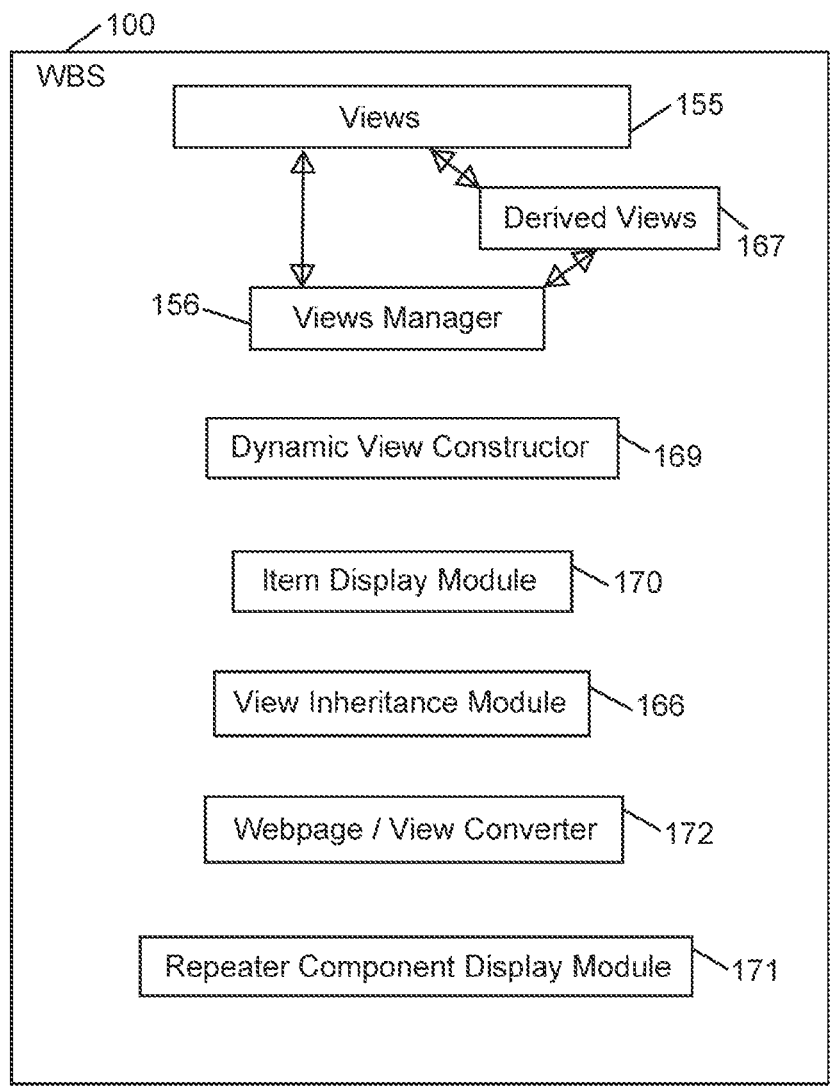

Reference is made to FIGS. 8-9, which are schematic block-diagram illustrations of WBS 100 demonstrating in particular Views and modules that manage such Views, in accordance with some demonstrative embodiments of the present invention. Each view 155 may be a special type of template used to display items from collections. Each view 155 displays a single item; whereas multiple item display may be achieved using multiple views inside an LC 152.

WBS 100 may comprise a Views Manager 156, able to utilize different views 155 for different items in the same collection. For example, if a user steps between blog records which have multiple formats (e.g., text entries, image entries, video entries), the view 155 used for display may change from item to item, altering the displayed format along the way.

The view 155 may include fixed view elements 157, which always apply to (or are included in) the displayed view; and/or conditional view elements 158 which may be associated with view conditions 159. For example, conditional view elements 158 may depend on one or more of the following: (a) The existence of a given data field in the underlying item; (b) The value of a given data field in the underlying item; (c) A pre-specified formula involving data fields values and relationships between them; (d) Parameters of the displaying LC 152 (e.g. display a given field only when displaying in a list-type gallery); (e) Attributes of the user, obtained from the user profile or other sources (e.g. display a particular field only to internal users within an organization, or to users located in a certain region only); (f) Usage mode (e.g., is the view 155 being used for creation, editing or display).

In a demonstrative implementation, view 155 may comprise one or more of the following elements: (a) Regular or fixed view elements 157 (e.g., page titles, background images); (b) Data components 162 which are filled with data from the displayed item (e.g., the price of a house offered for sale, the image of such house, a descriptive text); (c) Repeater components 163 used to display related lists inside the view (as detailed herein); (d) Calculated components 164 which display information calculated based on content from the displayed item (e.g. the Value Added Tax (VAT) value for a price taken from a numerical price field); (e) Conditional view elements 158 whose inclusion in the display (or whose attributes) depends on view conditions 159 (e.g. a colored ribbon displayed for restaurant items which have a predefined value in the field "offer of the day"); (f) data validation rules 161, which may depend on view conditions 159; (g) Conditional dynamic layout elements 165, which may be dynamic layout rules and anchors which may depend on view conditions 159.

WBS 100 may comprise a view inheritance module 166 enabling a view 155 to inherit from one or more other views 155, with additions, deletions and changes applied. For example, a "shirt" view may inherit from a "garment" view, and may have the additional component "sleeves (short/long)", thereby creating a derived view 167.

It is noted that views and item types are different entities and reside in different pools, although both of them may comprise field-like sub-entities and may have inheritance relationships (items may inherit from other items in the item pool, and views may inherit from other views in the views pool). The item type defines which fields are included in the item, whereas the view defines how these fields are displayed. WBS 100 may comprise a dynamic view constructor 169 enabling dynamic construction of views based on underlying template-type information and the specific item being displayed.

One or more pool(s) of views 168 may be implemented at the application level, at the designer level, or at the WBS level. Optionally, views 155 may be pre-defined to be associated with item types, such that a particular view 155 must always "belong" to a given item type (or to item types inheriting there from).

Using Views for Item Display

WBS 100 may comprise an item display module 170, which may display an item by using a predefined algorithm. Firstly, a matching view for the item display is located (or created on-the-fly); for example, item display module 170 may locate a view pre-associated with the item, or a view selected by searching the pool of available views; and if a suitable view is not located, then item display module 170 may automatically construct a suitable view "on-the-fly" based on the item definition. Secondly, item display module 170 may create a filled-in version of the selected view, by: (a) Matching each data component to a field in the item (if possible) and using the matching fields' content; (b) Determining the value of all calculated components; (c) Determining whether or not conditional view elements should be included. Subsequently, item display module 170 may perform dynamic layout on the filled-in view, thereby applying layout modifications resulting from changes to field content, conditional view elements, or the like; and may proceed to display the filled-in view.

It is noted that the process may be performed for multiple collection items; for example, when displaying an LC 152 which is a gallery-type multi-page container which displays multiple collection items simultaneously.

Repeater Components, and Using Views Inside Views

View 155 may contain one or more repeater component(s) 163. Each repeater component 163 may be generally similar to LC 152, but is contained inside the view 155. Each repeater component 163 displays a given list, and may typically display a list related to the main item being displayed in the view 155. For example, a person item may be related to other person items (e.g., friends of that person) and to car items (e.g., cars owned by that person). The person view may contain two repeater components 163 which display these lists (the "friends" list and the "cars" list). These two repeater components 163 would display the specific lists associated with the current person being viewed or highlighted in the primary person viewing LC 152. Note that repeater LC's should be differentiated from composite LC's as described above (and demonstrated in FIG. 23A)—repeater LC's display different related lists in different LC's, whereas composite LC's include multiple lists displayed inside a single LC.

Unless overridden by specific configuration parameters, a repeater component display module 171 may ensure that a repeater component 163 displays a list using the same view attributes (e.g. name, context) as the view 155 used to display the main component. For example, a view named XYZ for the type A may be used to display items of the type A; each of the items of type A may be linked to a set of items of type B; the list of type B items (related to the current type A) would be displayed in the repeater component 163 (as a default, unless configured otherwise) using a view named XYZ for the type B.

Using Website Pages for Item Display

In some embodiments of the present invention, instead of views which are used to display items inside LC's, the system may utilize website pages directly as if they are views. In such case, the system may display data taken from the associated items directly inside data components included in the website page. For example, the designer may include data components inside a regular website page, and may specify from which item their data should be taken. Optionally, a webpage/view converter 172 may be comprised in WBS 100 in order to implement the conversion or adjustments for utilizing a webpage as a view.

The item to be used as the data source may be selected in one or more suitable ways, for each data component; for example, out of these candidate items: (a) An item specifically associated with the website page (and thus, if this item is changed, such as in another page inheriting from the current page, then this would affect all data components); (b) An item pre-associated for this specific component; (c) An item answering a query specified for at the page or component level. The data component may also specify the data field to be used directly, or may use a field discovery/query mechanism.

Optionally, such page may be built and made into a template, to be re-used to display different items within a manually constructed page set. The designer may only need to specify which component would change when an alternate item is associated with the page.

Three-Stage Process

Figure 10:
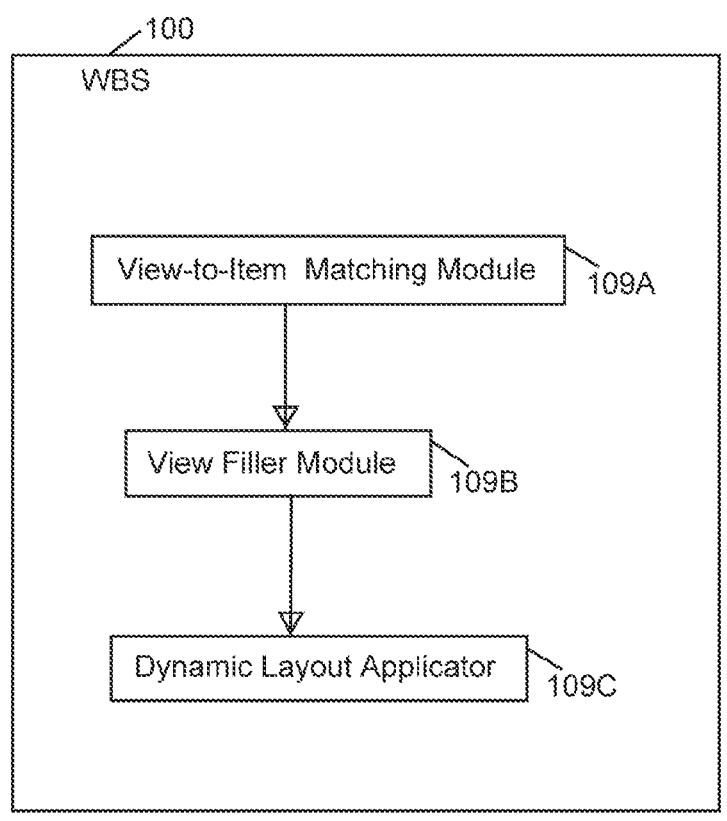
FIG. 10 is a schematic block-diagram illustration of the WBS demonstrating in particular modules of a three-stage process of View matching/construction and fill-out, in accordance with some demonstrative embodiments of the present invention.

Reference is made to FIG. 10, which is a schematic block-diagram illustration of WBS 100 demonstrating in particular modules of a three-stage process of View matching/construction and fill-out, in accordance with some demonstrative embodiments of the present invention. WBS 100 may comprise, for example: (a) A view-to-item matching module 109A, which may search and locate a matching view for the item(s) to be displayed, and may dynamically construct on-the-fly a view if no suitable pre-defined view is found; (b) A view filler module 109B, which may create a filled-in view based on the view fields and items' fields; and (c) a DL applicator 109C which may apply dynamic layout to the filled-in view.

Stage 1: Locate a Matching View for the Item (or Item Type)

Figure 11:
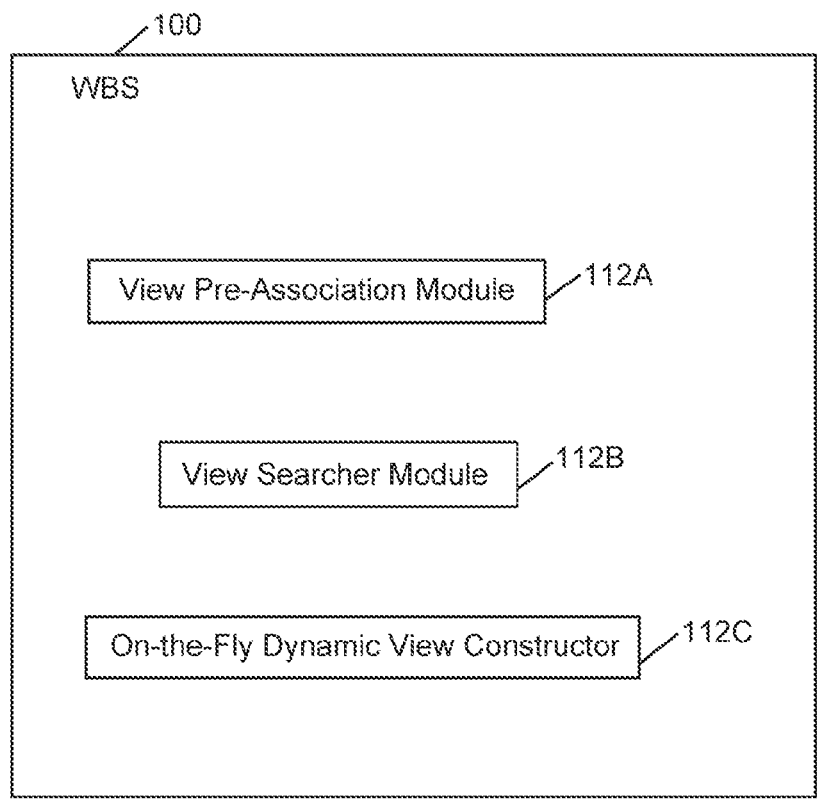
FIG. 11 is a schematic block-diagram illustration of the WBS demonstrating in particular view locating (or, matching of view to item), in accordance with some demonstrative embodiments of the present invention.

Reference is made to FIG. 11, which is a schematic block-diagram illustration of WBS 100 demonstrating in particular view locating (or, matching of view to item), in accordance with some demonstrative embodiments of the present invention. This may be the first stage of the three-stage process mentioned above.

The stage of locating a matching view for item(s) may be performed, for example: (i) by a View pre-association module 112A for pre-associating views with items and/or with item types; (ii) by a view searcher module 112B for searching the pool of available views; and/or (iii) by an on-the-fly dynamic view constructor 112C for dynamically constructing a suitable view "on-the-fly".

Pre-Associating Views with Items and/or with Item Types

Figure 12:
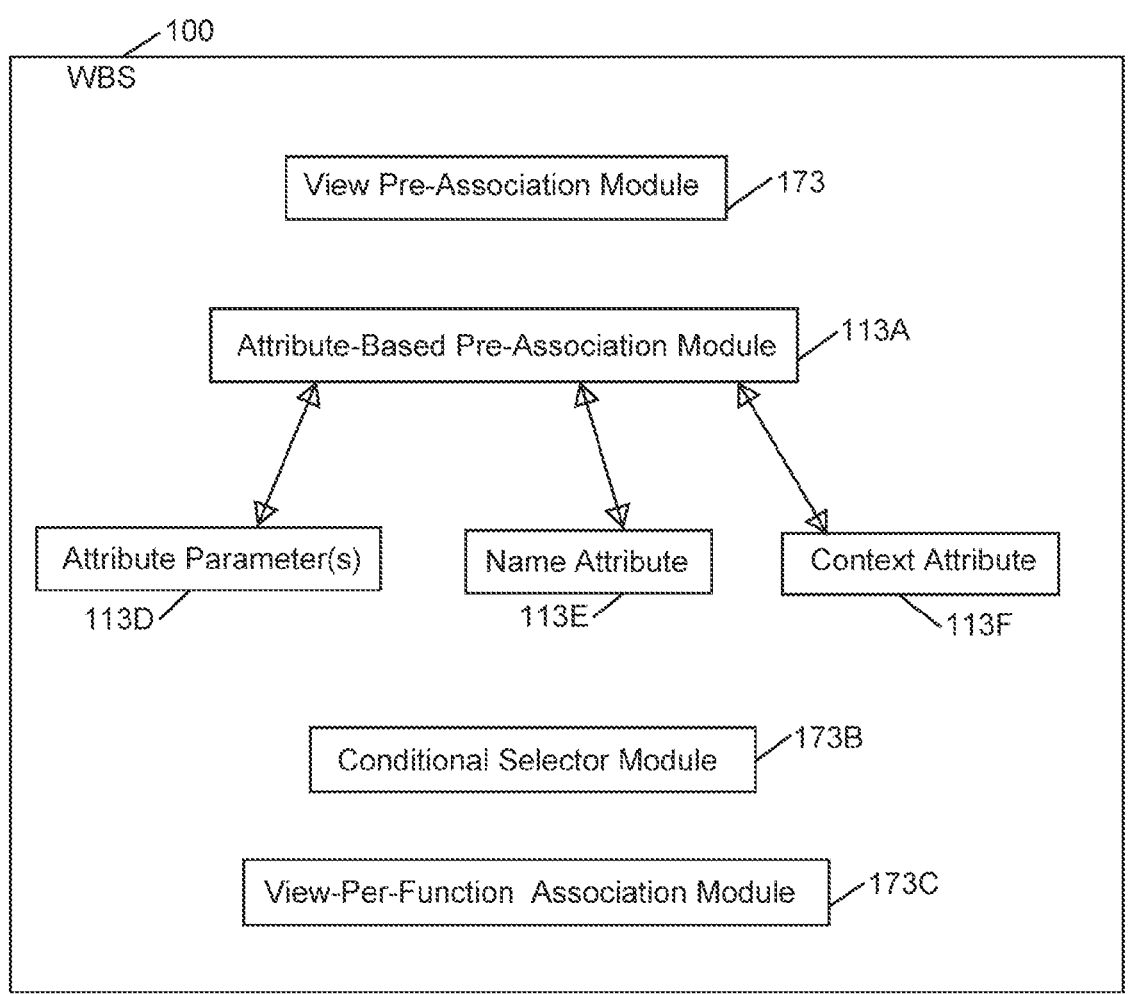
FIG. 12 is a schematic block-diagram illustration of the WBS demonstrating in particular View pre-association, in accordance with some demonstrative embodiments of the present invention.

Reference is made to FIG. 12, which is a schematic block-diagram illustration of WBS 100 demonstrating in particular View pre-association, in accordance with some demonstrative embodiments of the present invention. WBS 100 may comprise a view pre-association module 173 (which may be similar to view pre-association module 112A mentioned above), to enable pre-association of a view (or multiple views) with particular items and/or with particular item types. This may be done during the creation or editing of the specific items and/or item types, or during the creation or editing of inheriting items and item types.

Single view association may be performed by the designer who may explicitly associate a view with any given item type, and the association will be used for all items having the given item type. The association may further be used for all item types inheriting from the given item type, unless they have their own explicitly assigned view. The designer may also explicitly associate a view with any specific item, thereby overriding the view associated with the item type of the given item.

Optionally, an attribute-based pre-association module 113A may enable a view to be pre-associated via attribute parameters 113D (including the use of context-based association, type-specific names and inheritance-adapted association as further described below). For example, attribute-based pre-association may be used when the system needs to link to views according to generic name, context, class, or other parameters. The attribute-based pre-association module 113A may support attribute-based pre-association as follows: (a) The system defines specific attributes to views (e.g. name, context); (b) The view creator assigns values to these attributes; (c) The designer (using the list and the view) specifies the value for the given attribute; (d) The view would be selected based on the provided attribute values (e.g. name, context).

In a demonstrative example, the system may include a name attribute 113E for each view, unique for each item type. The designer may specify the view name to use when defining the LC (or webpage). For each item type, the view having the given name and associated with the given item type would be used. It is noted that there may be multiple views with the same name for different item types; and thus, specifying the view name may actually create multiple association relationships (e.g., as noted herein for repeater components).

Figure 23A:
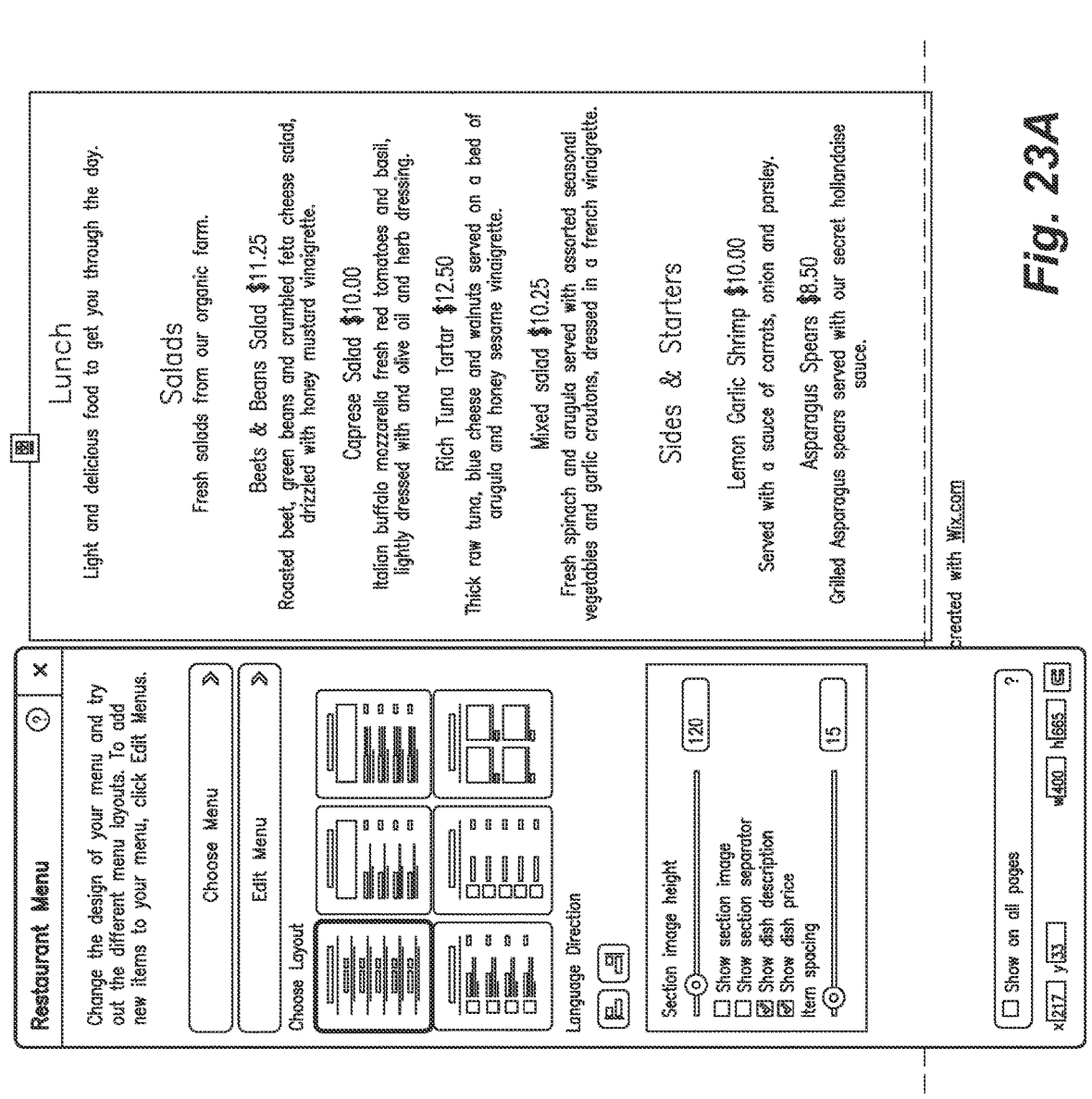
FIG. 23A is a demonstrative restaurant LA displaying an item hierarchy from multiple collections inside a single LC, in accordance with some demonstrative embodiments of the present invention.
Figure 23B:
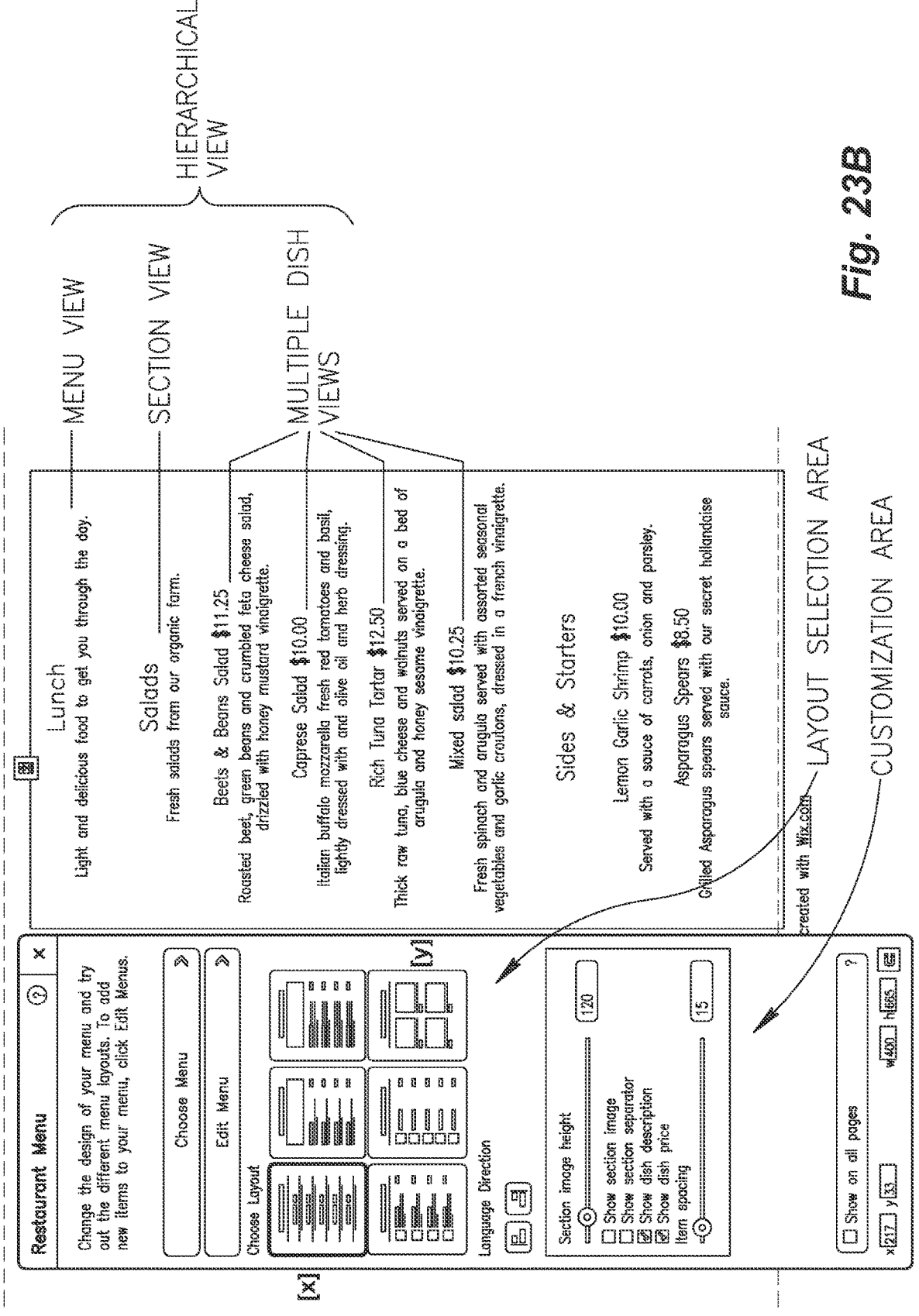
FIG. 23B is an annotated version of the demonstrative restaurant LA, in accordance with some demonstrative embodiments of the present invention.

In another demonstrative example, the system may assign a context attribute 113F, with the possible values of "thumbnail-mode" and "zoom-mode". The designer may specify for a given LC (or repeater component or webpage) the context for view selection (e.g., thumbnail-mode or zoom-mode), and the selected view (for each type) would be the view having the given context. Demonstrative examples are shown in FIGS. 23A and 25, which show the same restaurant list application, which includes the three collections (menu, section and dish) and the matching item types. However, there are multiple views associated with each of the 3 types, and these are arranged as layouts, each layout defining a specific view for each of the 3 types. As can be seen in these figures, the user may select a layout in the layout selection area (e.g. layout [x] in FIG. 23B and layout [y] in FIG. 25)

and this affects the view used for each of the 3 item types. The layout name/code serves as the context variable in this case.

Alternatively, multiple views may be explicitly associated with a given item or item type. In such cases, a conditional selector module 173B may define and/or enforce one or more conditions under which one of the associated views is selected. Such conditions may include, for example: (a) the type of LC used to display the item (e.g., a large area container may use a detailed view (displaying many fields), whereas a gallery type container may use a smaller view which includes a thumbnail and a descriptive text only); (b) The content of a specific "selector" field in the item being displayed; (c) The identity of the user accessing the collection, or specific properties in the user profile of the accessing user (e.g., an online store employee may be able to view more information in additional fields, relative to the content displayed to a visiting guest user).

Optionally, a view-per-function association module 173C may be used to associate different views for different functions, and to enforce such association. For example, WBS 100 may assign different views for item viewing, item creation, and item updating. The designer may define these views, and may also specify that a given view will be used for multiple functions (e.g., used for both item creation and item updating).

Searching the Pool of Available Views

Figure 13:
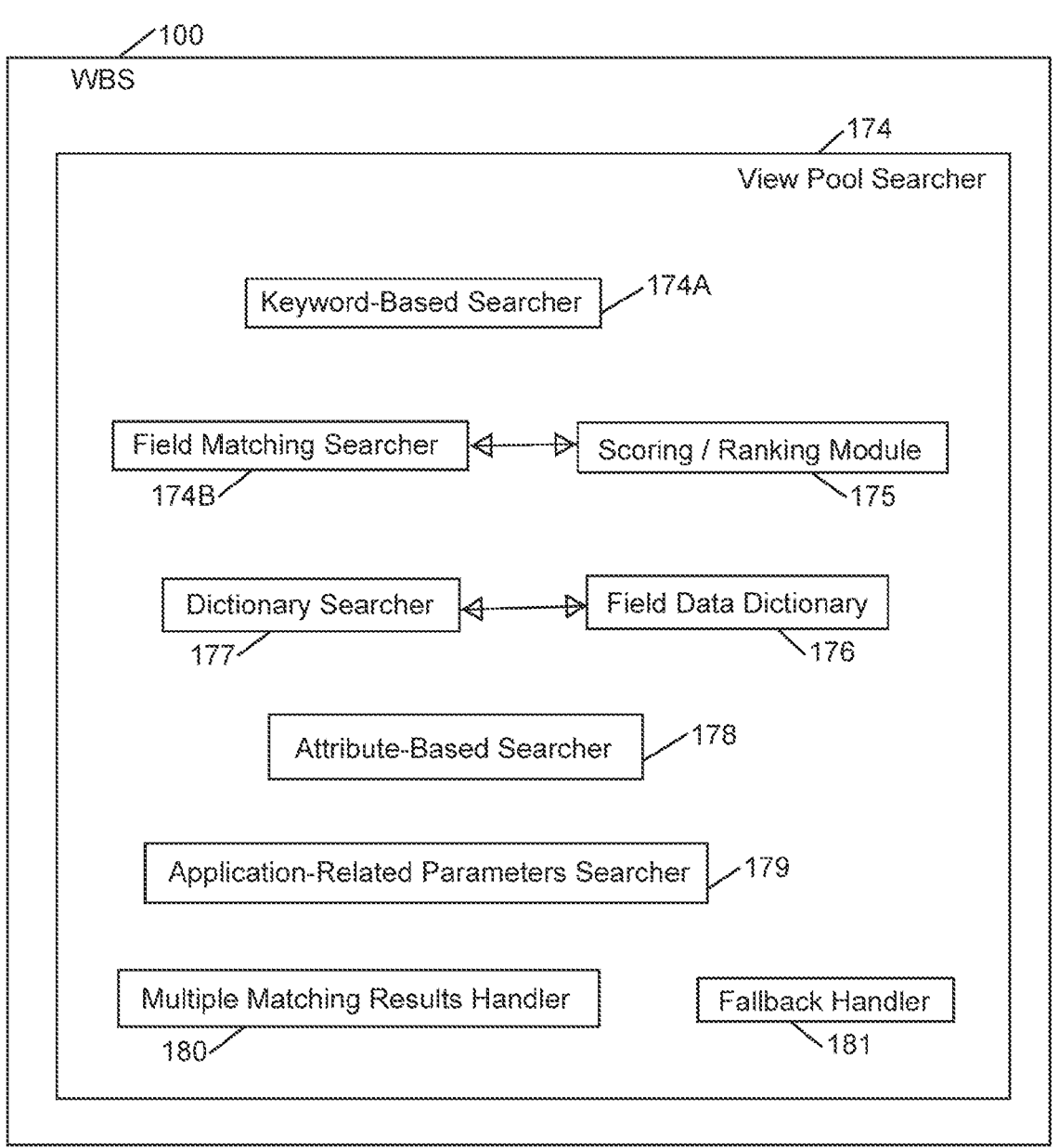
FIG. 13 is a schematic block-diagram illustration of the WBS demonstrating in particular View searching, in accordance with some demonstrative embodiments of the present invention.

Reference is made to FIG. 13, which is a schematic block-diagram illustration of WBS 100 demonstrating in particular View searching, in accordance with some demonstrative embodiments of the present invention. WBS 100 may comprise a view pool searcher 174 (a searcher module to search pool(s) of views), which may execute a search query on the view pool in order to locate a matching view. The applicable view pool may be defined at any suitable level, for example, the system level, the application level, the item collection level, or the item type level. It may also be a combination of several pools (e.g., defined at different levels).

The view pool searcher 174 may utilize one or more suitable query types, for example, keyword based, field matching, attribute matching, application-related parameters, or other suitable types of query. The view pool searcher 174 may combine two or more of the query methods, for example, to select among the views having a matching fields while applying a particular condition to the view attributes.

In keyword based view search, which may be implemented by using a keyword-based view searcher 174A module or sub-module, both item types and views may have attached or associated keywords (e.g., one or more keywords, possibly selected from a pre-defined list). The matching algorithm attempts to locate views having the largest keyword match with the item type keyword list.

In field matching view search, a field matching searcher 174B module or sub-module may search for the view which has the component set best matching to the set of fields in the item. The matching may be performed according to field names, attributes, or special matching ID's. The grading or scoring or ranking of matches may be performed by a scoring/ranking module 175, for example, by comparing the number of matching fields, or by using a per-field weight to calculate a weighted score.

Optionally, a field data dictionary 176 may be defined and used (e.g., at the system level, application level, or another level) for creation of both item type fields and view components. The matching may be done by using the field data dictionary 176, for example, by utilizing a dictionary searcher 177 for locating view components and item fields having a matching underlying data dictionary field.

An attribute-based searcher 178 may perform attribute-based searching. For example, views may have additional attributes assigned to them in order to assist in matching views to items. The item type (or the item) may include a query (using a suitable query or expression language) which is applied to the relevant or available views to select which views are the best match for this item based on the one or more of the view attributes. The query may be completely specified (e.g., include all conditions), or may be parameterized to include one or more parameters, for example: (a) Item-specific values (e.g., the query is specified at the item type level, but has specific parameters filled in by the item); (b) Item data field values (e.g., parameters based on data fields in the specific item); (c) LC type (e.g., parameters depending on the specific LC in which the view is to be displayed), for example, such that the LC size and container-type may determine which view size is optimal; and/or (d) General environment values (e.g., the user classification and privileges). The attribute-based searching may be implemented as a generalized version of the view attribute pre-association (e.g., via name/context) described above.

Optionally, view and item type matching may be performed by based on application-related parameters, by utilizing an application-related parameters searcher 179. The view searching may thus take into account application-related parameters; for example, different views may be selected dynamically for the first and last item in a filter query result. This way, "next" and "previous" navigation buttons may be displayed dynamically as needed.

A multiple matching results handler 180 may handle multiple results, since some of the matching techniques described above may yield multiple candidate views for the display of a particular item. In such case, match rating may be used (e.g., generally similar to search engine ranking) to select the best view to use among the candidate results. Furthermore, the multiple matching results handler 180 may elect to use the best match found, but may retain the list of candidate views, and may provide a GUI element which allows the user to switch the display in order to utilize one of the other view candidates that were found.

A fallback handler 181 may ensure fallback to parent item type. For example, item types may be created through an inheritance process based on other item types and a set of modifications. If no result (or no "good" result, or high-quality match, or high-scoring match) was found for the given item and item type, then the fallback handler 181 may command to re-execute the matching process using the same item data values (if relevant) but use the item type which is the parent of the current item type. For example, a "shirt" item type may be a derived from the parent item type "product"; if no matching view (or no high-scoring matching view) was found for an item of the type "shirt", then the matching process may be automatically repeated, this time using the parent item type "product" rather than the item type "shirt".

Dynamic View Construction

Figure 14:
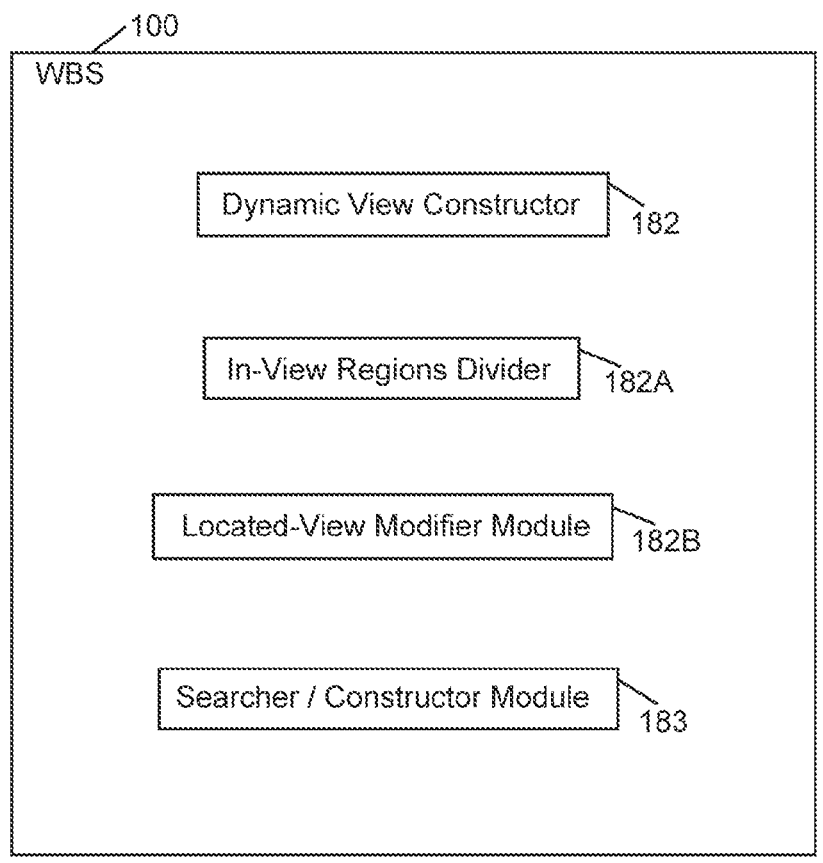
FIG. 14 is a schematic block-diagram illustration of the WBS demonstrating in particular Dynamic View Construction, in accordance with some demonstrative embodiments of the present invention.

Reference is made to FIG. 14, which is a schematic block-diagram illustration of WBS 100 demonstrating in particular Dynamic View Construction, in accordance with some demonstrative embodiments of the present invention. WBS 100 may comprise a dynamic view constructor 182, to dynamically generate "on-the-fly" one or more views as may be required or preferred in order to display the item fields, instead of searching a pool of existing views; or, in addition to searching a pool of existing views (e.g., if no match is found in the existing pool of views; or if only low-scoring matches are found). Automatic view construction directives may be pre-defined or provided, together with field definitions.

In a demonstrative implementation, for example, dynamic view constructor 182 may implement a number of abstract, generic view templates which only divide the display area into multiple regions, implemented using an in-view regions divider 182A module or sub-module. Each item type may specify which such generic template to use. Each field may specify, for example, the region into which the field should be placed, and an alignment code indicating where the field should be added (e.g., top left, bottom center), as well as how the field may be related to the previous field(s) in the same area of the region (e.g., join after previous field; new line; below but aligned to the left in the same way). A field may also specify dynamic layout type anchors or other layout rules (e.g., specifying that two particular fields should be vertically aligned). Dynamic view constructor 182 may thus create an appropriate view for each item type automatically based on the provided directives and rules. This may be particularly useful for automatic creation of data entry forms, updating forms, and/or other forms.

Integrated View Searching/Dynamic Construction

As described above, the WBS 100 may locate views (using pre-association or searching) or may create views dynamically. Furthermore, WBS 100 may also integrate the two methods, by locating a base view, and then expanding it (when needed) or otherwise modifying it (via a located-view modifier module 182B) using the dynamic view construction techniques noted above (e.g., landing zones). This may be implemented by using a searcher/constructor module 183, and may be particularly useful for items having a relatively fixed base format (and set of fields), which also have additional fields added dynamically (e.g., RSS feed with optional fields).

View Selection and Polymorphic Display

Figure 15:
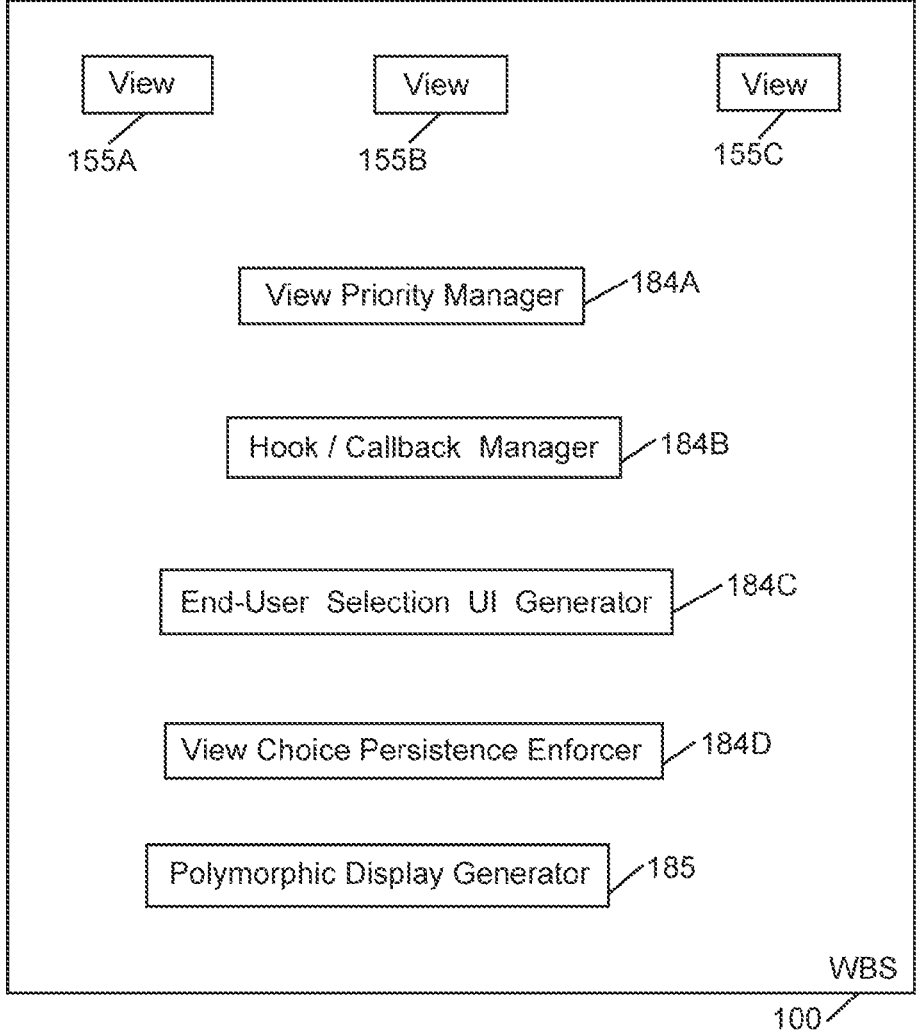
FIG. 15 is a schematic block-diagram illustration of the WBS demonstrating in particular view selection and polymorphic display, in accordance with some demonstrative embodiments of the present invention.

Reference is made to FIG. 15, which is a schematic block-diagram illustration of WBS 100 demonstrating in particular view selection and polymorphic display, in accordance with some demonstrative embodiments of the present invention. In some cases, multiple views (e.g., views 155A, 155B and 155C) may be available for the viewing of the same item. This may occur, for example, due to the designer pre-associating multiple views with the same item (or item type), or due to a view selection query resulting in multiple matching views. The set of possible matching views may be known in advance (e.g., if they have pre-associated with the item), or may be dynamically determined (e.g., in the case of views located using a matching query).

In such cases, WBS 100 may provide one or more options to the designer, for example: (a) To utilize a View priority manager 184A in order to attach priority value to the various views (assuming that they are known in advance), such that WBS 100 would select the view having the highest priority value; (b) To use a hook/callback manager 184B in order to define a hook or callback into the application, which would allow the application to select the right view to use; (c) To use an end-user selection UI generator 184C in order to expose the multiple view options to the end-user, allowing him or her to select the view to be used for the given item (e.g., using a default view and including a "change view" drop down menu or combo box widget in the display).

In a first demonstrative example, a view choice persistence enforcer 184D may ensure that view choice is persistent. For example, item display typically allows the end-user to step between the displayed items in the collection (e.g., navigating to the previous or the next item). The displayed items may have different views used to display them. The view choice persistence enforcer 184 may allow the designer to specify that the choice of a view to display a given item type is persistent. Accordingly, if the end-user steps over the items in the collection, and returns to the same item type, the same view (among the multiple possible views) would be used; unless there is a specific reason not to re-use it (such as, a separate distinct view association for the viewed item).

In a second demonstrative example, a polymorphic display generator 185 may enable polymorphic display. For example, the end-user may affect the selection of view by changing the main display type (e.g., multi-page container type) used by the LC to display the items. The designer may allow the end-user to determine if a given list would be viewed in a "list mode" (displaying 1-2 lines of information per item) or in a "page mode" (display a full page of information from the given item). Similarly, a designer may allow the end-user to switch a LC display between a grid-type gallery (which shows the items arranged in a grid) to a slider-type gallery (which shows the item in a slide-show-like arrangement). The choice of LC display mode may affect the view chosen for display as well. The polymorphic display generator 185 may be used to ensure that the user may switch among multiple views (or LC displays) that the designer designated in advance for this purpose.

Stage 2: Create a Filled-In View Based on View and Item's Fields

Figure 16:
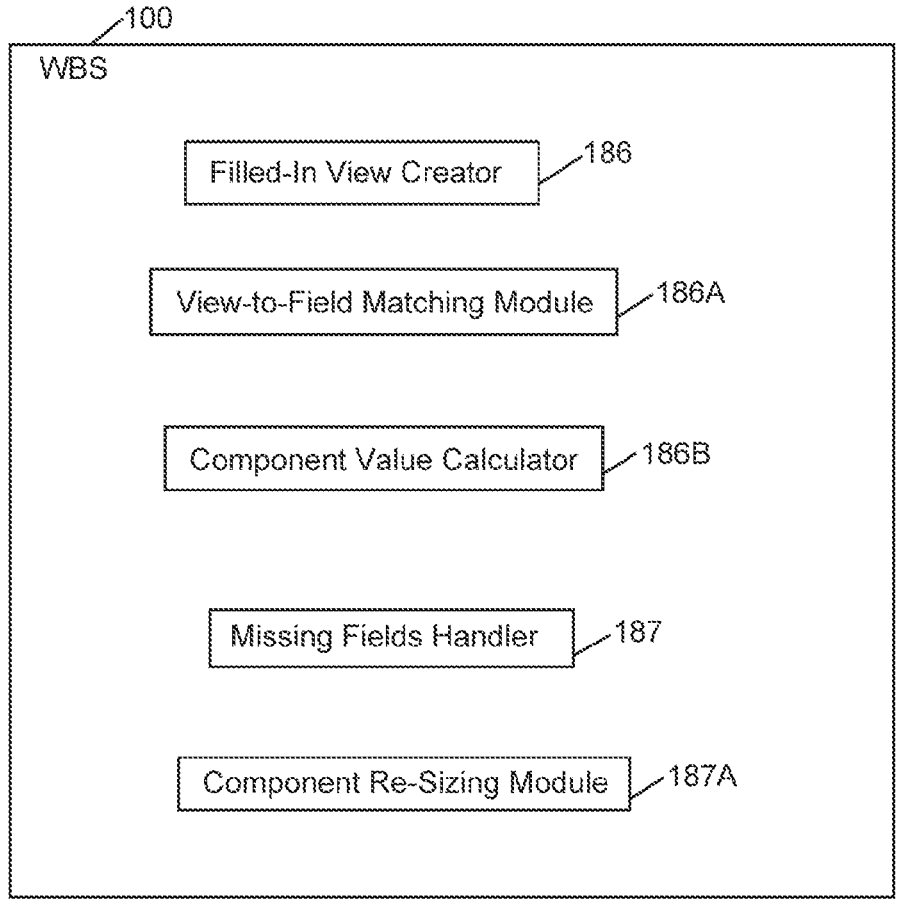
FIG. 16 is a schematic block-diagram illustration of the WBS demonstrating in particular filled-in view creation, in accordance with some demonstrative embodiments of the present invention.

Reference is made to FIG. 16, which is a schematic block-diagram illustration of WBS 100 demonstrating in particular filled-in view creation, in accordance with some demonstrative embodiments of the present invention. WBS 100 may comprise a filled-in view creator 186, to create a filled-in version of the matched view or the dynamically-constructed view. It is clarified that a filled-in view may be an instance of the view entity, constructed dynamically based on the data supplied by the item.

First, the filled-in view creator 186 may utilize a view-to-field matching module 186A or sub-module, to map each data component in the view to a matching field in the item type (and underlying item). This may be done, for example, using one or more of the following methods: (a) Explicit pre-association by the designer; (b) Common name used by view component and item field; (c) Special association ID; (d) Query over matching keywords assigned to view components and item fields; (e) A query defined for a data component which searches pre-specified attributes in the fields of the matching item. For non-data components (e.g., title text), such matching may not be required.

A missing fields handler 187 may handle missing fields—view fields (which should be filled with content) for which no matching item field was found. For example, if no matching field was found, the missing fields handler 187 may display the appropriate text or image in-place of the view component (provided by the data component itself or by WBS 100). This could occur during design-time or during run-time (e.g., when items are provided by RSS feeds and some required fields may be missing). Optionally, an unobtrusive message or low-key warning message may be provided or displayed or logged. The actual display message shown may depend on the URL used for the call or the user login; such that, for example, the designer may receive a more comprehensive message.

If the component has anchors or other DL-related association, the missing fields handler 187 may not remove the component, but rather, may utilize a component re-sizing module 187A to resize it to zero size. If the component does not have anchors or other DL-related association, then the missing fields handler 187 may remove the component together with any layout related spacers attached to it, such that no extra space may remain which would have been added if the field was present.

Second, the filled-in view creator 186 may utilize a component value calculator 186B to determine the value of all calculated components; for example, calculated based on the values of the fields, including in particular the value filled into the data components. Third, the filled-in view creator 186 may determine whether or not conditional components should be included; for example, the view may contain conditional components whose inclusion depends on one or more conditions.

Stage 3: Apply Dynamic Layout to the Filled-In View

Figure 17:
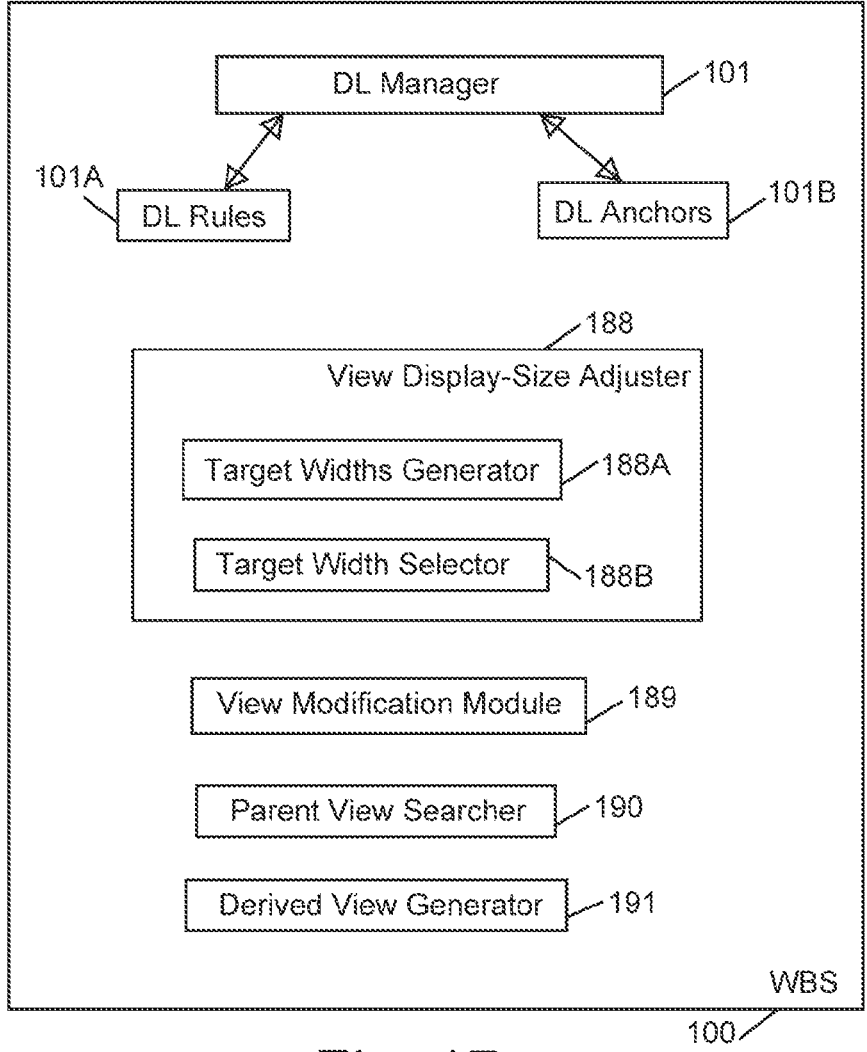
FIG. 17 is a schematic block-diagram illustration of the WBS demonstrating dynamic layout and adjustments for a filled-in view, in accordance with some demonstrative embodiments of the present invention.

Reference is made to FIG. 17, which is a schematic block-diagram illustration of WBS 100 demonstrating dynamic layout and adjustments for a filled-in view, in accordance with some demonstrative embodiments of the present invention. For example, DLM 101 may apply DL processing to the complete page (or mini-page) containing the LC or LC's based on the filled-in view. This DL processing may be done in conjunction with determining the best display size to use for the filled-in view.

The DL processing may take into account specific DL rules 101A and/or DL anchors 101B, for example, originating from the following: (a) The underlying item containing the LC; (b) Fixed DL information contained in the view definition; (c) Conditional DL information contained in the view definition applicable depending on the specified view conditions.

The DL processing may affect the entire page containing the LC. For example, if the LC is used to view a new item in which a given text field is larger than the currently displayed item, then DLM 101 may cause the entire displayed mini-page (containing the view) to grow or increase in size, thereby causing the LC to grow and causing movement or relocation of components in the containing page.

DLM 101 may apply animation and transition effects, so that the changes resulting from switching items (and possibly views) in the LC would be presented via smooth, animated changes, rather than abrupt changes.

Determining and Adjusting the Display Size of a View

The display area required by a specific filled-in view instance may vary, and may be determined and/or adjusted (e.g., modified) by a view display-size adjuster 188, since the data components in the view (e.g., text, image) may include different amount of data for different instances of the view. The view is typically displayed using the size defined for it in the WBS 100. However in some cases, the size may be optimized to a specific screen, browser or device configuration. In such cases, view display-size adjuster 188 may adjust the area allocated to the view, while taking into account the specific fill-in view data.

For example, changes in the view width may affect view height. In particular, text display components which are required to fit a narrower area (horizontally) may grow vertically in order to display the same amount of text (e.g., breaking it into more lines).

The view display-size adjuster 188 may optimize the displayed view for the best aesthetically pleasing result. For example, view display-size adjuster 188 attempts to find the best size (and resulting layout) for the view, to achieve or optimize one or more for the following (possibly contradictory) targets: (a) Getting the displayed view to have an aspect ratio as close as possible to the browser display window for the application; (b) Minimizing the amount of scrolling needed to watch the entire view (e.g., if it expands vertically down and requires scrolling); (c) Complying with all DL rules and anchors specified for the view.

In a demonstrative implementation, view display-size adjuster 188 may perform the following operations: (a) Take original view instance width; (b) utilize a Target Widths generator 188A to create a set of possible target widths, starting with the original width and going down until a pre-defined value parameter (e.g., 100 pixels), thereby creating a set of possible "target widths" (e.g., computed by limiting the set size by minimal difference between the sizes); (c) Perform DL calculation for the view instance for each of the target widths, and obtain the resulting height for each of the target widths; (d) Find and select, using a Target Width selector 188B module or sub-module, the resulting height-width set which is closest to the aspect ratio of the enclosing page display window, but does not exceed the available screen height; (e) If, for each one of the target widths, the height exceeds the available screen height, then select the target width which has the smallest height.

View Modification and Derived Views

A view modification module 189 may enable the designer to modify a view by adding, removing and/or modifying the displayed components. The system may allow the designer to apply the modification "in-place" (e.g., affect the actual view and all items using it), or to create a derived (inherited) view from the edited (modified) view.

A derived view may be regarded as inheritance-based variant of a parent view. For example, a "shirt" view is a derived child of the "product" view, but may have an additional "color" attribute/field. If the view is associated with a given item type (or types), the creation of a derived view may also create a similarly modified item type (or types) which may be used to create items in the associated collection or other collections.

In accordance with the present invention, WBS 100 may use the given view if it is relevant to the item; and if this is not possible, then WBS 100 may invoke a parent view searcher 190 in order to go up the inheritance tree (or inheritance chain) and may use the higher level view(s) to display the given item. In some implementations, if no matching view is found, then WBS 100 may go up the Item Type inheritance tree (e.g., using fallback handler 181); whereas, in other implementations, if no matching view is found, then WBS 100 may go up the View inheritance tree (e.g., using the parent view searcher 190). Other implementations may utilize a combination of both methods, with a mechanism to determine on-the-fly which matching method to prefer, or which matched result to prefer and to utilize.

The created (modified) view is available for other items as well. When a derived view is created or modified, it may be applied to (or pre-associated with) existing items or item types.

WBS 100 may further provide the inverse option, allowing the designer to create derived types and have the WBS 100 automatically invoke a derived view generator 191 in order to automatically create a matching derived view as well; for example, creating a derived view based on derived type (instead of the other way around).

The designer may create the new component based on a single-component template. The view creator may further include such single-component templates together with the created view, and such component templates may be suggested to designers who wish to modify the template.

Component Landing Zones

Figure 18:
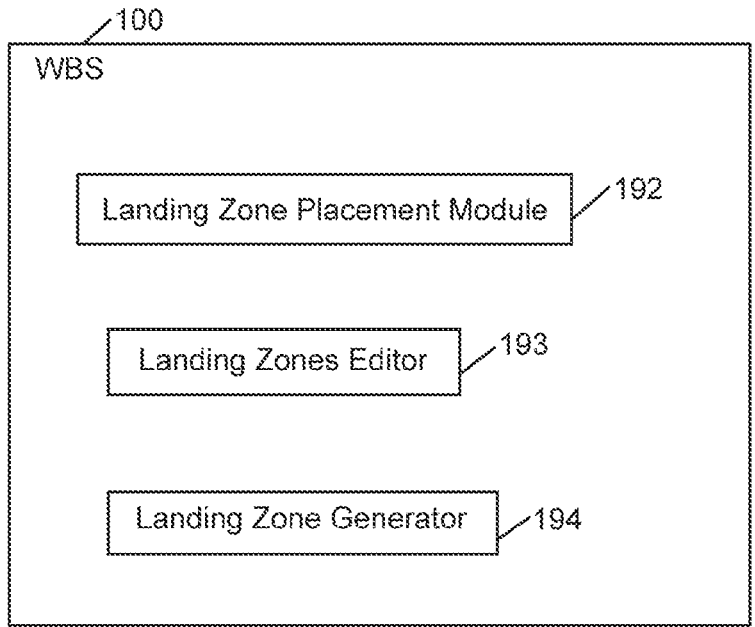
FIG. 18 is a schematic block-diagram illustration of the WBS demonstrating landing zone placement and modification, in accordance with some demonstrative embodiments of the present invention.

Reference is made to FIG. 18, which is a schematic block-diagram illustration of WBS 100 demonstrating landing zone placement and modification, in accordance with some demonstrative embodiments of the present invention. WBS 100 may support landing zones, such that new components added to a view may be placed automatically or semi-automatically within the view by a landing zone placement module 192. The view designer may define a number of landing zones in the view template. For example, components may be arranged in multiple columns, and a landing zone is created at the bottom of each column; or alternatively, components may be arranged in a certain container hierarchy, and a landing zone may be defined at the bottom of some (but not all) of the containers. The original view designer may use a landing zones editor 193 to designate explicitly-specified landing zones, to assign names to defined "landing zones" and to specify various landing zone attributes. When a new component is added to the view, a list (e.g., drop-down list) of the landing zone names is shown, and the designer may select a target area for the new component.

The landing zones may include designer-specified attributes which define rules for finding matching component templates. For example, if the designer specified that the new component is to be added to a wide column, the system may recommend a wide-format component template. This effect may operate in both directions, such that the landing zone selection may affect the recommended component templates, and vice versa.

Optionally, a landing zone generator 194 may generate landing zones automatically, including (for example): (a) At the end of each container or mini-page; (b) At the end of containers having a given type or attribute; (c) Following places where recent field additions were made; (d) At locations having at least a given amount of empty screen space; (e) in a newly created page or mini-page (e.g., by adding component to an additional page in a multi-page container). When a component is added to a view (using a landing zone or otherwise), the view's layout is recalculated through the use of dynamic layout.

Applying a Derived View

Figure 19:
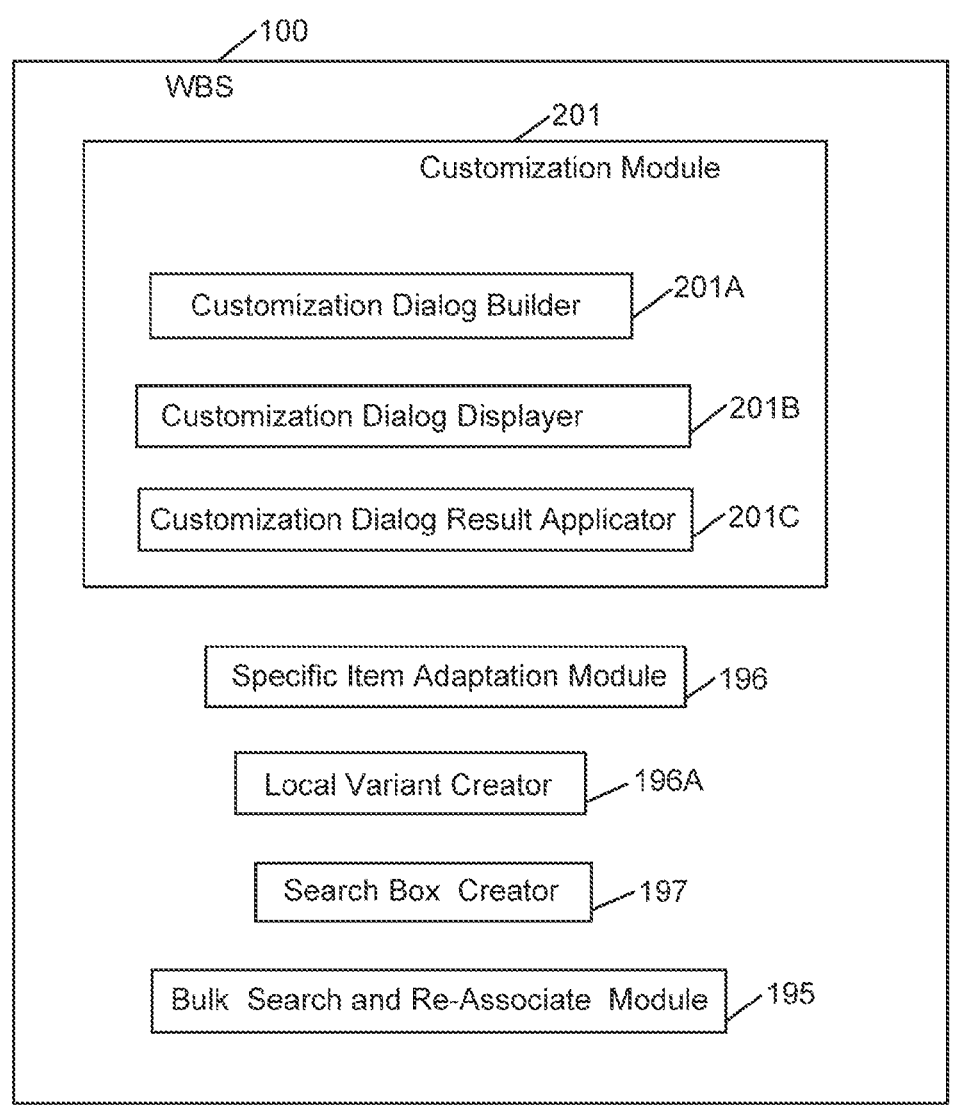
FIG. 19 is a schematic block-diagram illustration of the WBS demonstrating in particular view modification, in accordance with some demonstrative embodiments of the present invention.

Reference is made to FIG. 19, which is a schematic block-diagram illustration of WBS 100 demonstrating in particular view modification, in accordance with some demonstrative embodiments of the present invention. When modifying a view, the WBS 100 may create a derived view which inherits from an existing view being modified. The existing view may be associated with a number of item types (possibly used by multiple items in multiple collections), and may also be directly associated with multiple items in multiple collections. In such case, the WBS 100 may invoke a "bulk search and re-associate" module 195 to perform mass (or bulk, or batch) re-association of types and/or items.

For example, the "bulk search and re-associate" module 195 may scan all types and/or items that are directly or indirectly associated with the existing view; and may re-associate them with the derived view. The criteria for re-association may include, for example: (a) Conditions based on item fields' content; (b) Conditions based on item fields' existence; (c) Condition based on type/item attributes; (d) a combination of the above criteria. Optionally, manual confirmation may be requested from the designer, with regard to which types/items to re-associate (e.g., requested on a per-type or per-item basis).

In a demonstrative example, when creating a "shirt" item type derived from the "product" item type, the designer may specify that the products collection would be scanned, and that all "product" items having the word "shirt" in their title and which have been created in the last two months would be automatically converted to the "shirt" type.

Customizations and Customization Dialogs

WBS 100 may comprise a customization module 201, which provides for the creation of customization dialogs which can be used by the designer (and possibly the end-user) to customize various parameters and attributes in the displayed list application.

It will be appreciated that customization module 201 may include, or may be associated with, or may utilize or implement, various features and/or technologies and/or sub-modules and/or processes, for example, as described in U.S. patent application Ser. No. 14/207,930, entitled "A System and Method for Dialog Customization filed Mar. 13, 2014 which issued as U.S. Pat. No. 9,753,911 on Sep. 5, 2017 and which is hereby incorporated by reference in its entirety.

Such customization may be applied to website elements, including views, items and view/item combinations (e.g., a given item is customized in some way, but only when displayed in a given view). It may also be applied to third-party applications included in the created website. The customization option may be available to the designer, or possibly to down-stream users of the application having specific design/modification privileges.

The customization may affect attributes and elements of the specific items or views involved, as well as other objects related to them (e.g., through containment or inheritance). It may include customizations such as (for example): (a) Should the system display a given component at all (yes or no); (b) Fixed content (e.g., title text); (c) The display attributes (e.g., font, size, color) of a specific component; (d) Screen distances (e.g. distance between dish name and its description); (e) Counts (e.g. number of columns in multi-column display); (f) Generic parameters—which are handed over to the component/element handling the display; and/or other suitable customizations.

The WBS 100 supports customization through the use of generated dialogs which include attributes to be customized. Such dialogs are generated using a customization dialog builder 201A, displayed to the user (and able to interact with the user) using a customization dialog displayer 201B and are then applied to the affected elements using a customization dialog result applicator 201C.

In many cases, a single customization value should affect multiple elements. For example, the same color adaptation should apply to multiple components in the display view which need to remain harmonious; the distances between the right edge of the view and two separate components may be adjusted, but must remain the same for both components. Furthermore, a customization may affect (for example) a specific displayed view, all displayed views (of a given type, or of all types), all instances of a given view or views in a given scope (even if not currently displayed), or specific view instances as explicitly selected by the designer.

The effect of customization might not be identical on all affected objects. For example, components A and B may be required to maintain a particular layout, such as, that the distance of component B from the top of the view would be twice that of the distance of component A from the top of the view. In such case, the customization may be applied individually as required (using an object-specific formula).

An example customization dialog is shown in FIG. 23A. In this example, a restaurant List Application (LA) displays items from three collections (menu, section and dish) hierarchically inside a single LC. The system generated the customization dialog shown which includes the customizations "Section image height", "Show section image", "Show section image separator", "Show dish description", "Show dish price" and "item spacing". The values entered through this dialog affect all views displayed in the current LC.

Figure 27:
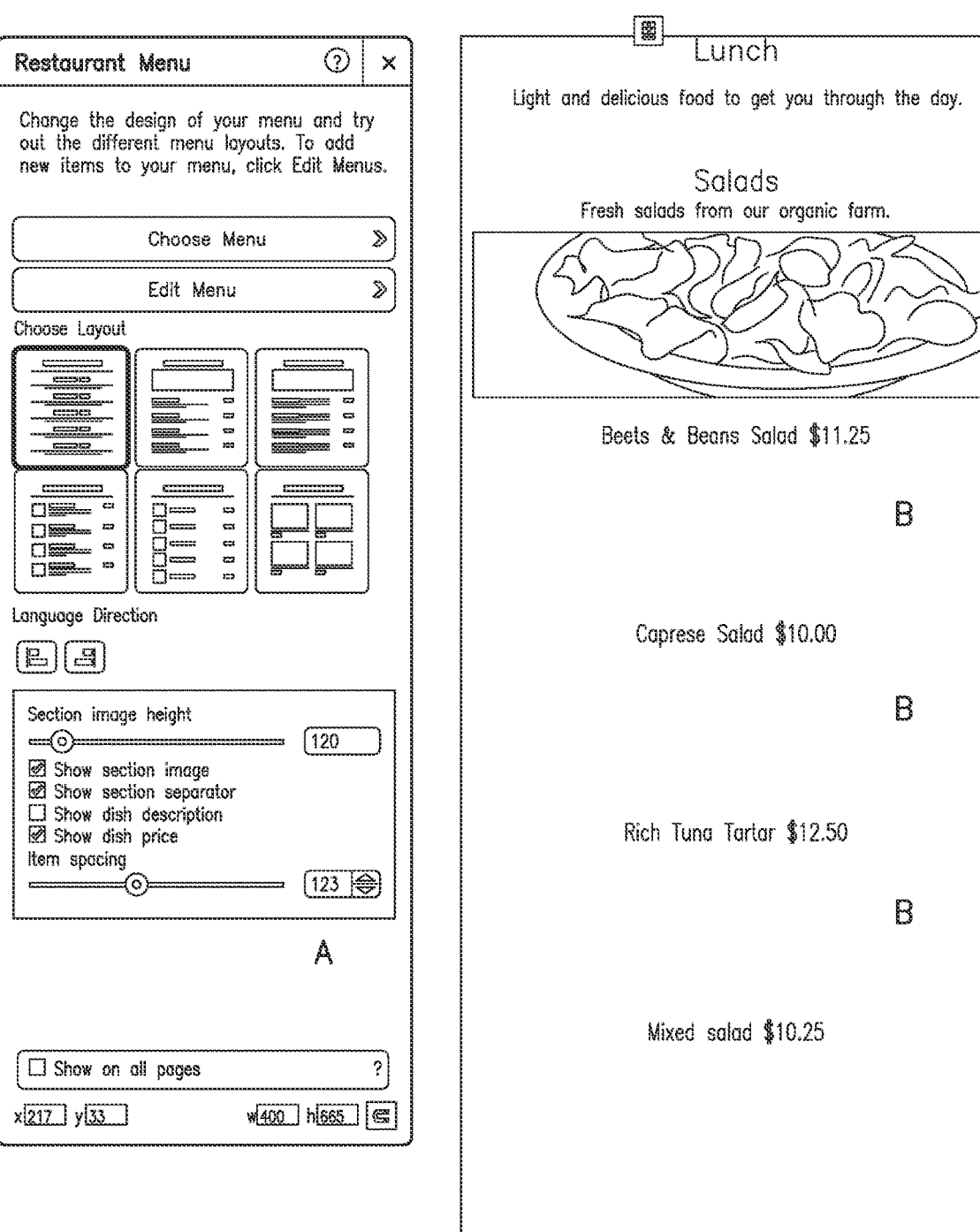
FIG. 27 is a demonstrative effect of increasing the "item spacing" value on the spacing between view instances in the sample LA, in accordance with some demonstrative embodiments of the present invention.

Following this example, FIG. 27 demonstrates how changing the customization value "item spacing" (A) from 15 pixels (as in FIG. 23A) to 123 pixels would increase the spacing (B) between the multiple instances of the "dish" view.

The generated dialog may be pre-specified or automatically generated. It may also be a stand-alone UI element or integrated with the rest of the WBS 100 UI. It may also be automatically displayed, or require explicit invocation by the designer.

Specific Item Adaptation

WBS 100 may comprise a specific item adaptation module 196 to create adaptations to a specific item, for example, by adding (e.g., via drag-and-drop) specific components to a displayed item at the item level and in the context of a specific view. This may be used, for example, to add "decoration" elements to specific items, or to add additional information which is only available to certain specific items, without having to create separate item types and views.

For example, the WBS 100 may utilize a local variant creator 196A to automatically create a local variant of the view, or an "internal" derived view. The adaptations may be stored as a "layer" of modifications to the existing view inside this local variant of derived view. The WBS 100 may store this derived view at the site level or page level or LC level, together with an ID of the item for which this adaptation is applied. The adaptation may also be stored with the same list application whose instance is used in the site. The same LC or page may store multiple adaptations to multiple items. The WBS 100 applies the adaptation every time that the item is displayed with the specific view in the specific LC.

In some embodiments, optionally, the specific item adaptation module 196 may offer the capability to apply the same adaptations to other items in the same LC which use the same view, or to other views.

If adaptations are stored at the site level, then the adaptation will apply to instances of the same item being displayed in the same view in different LC's (or repeater components). It is noted that adaptations are different from item customization; for example, adaptations involve adding additional elements and components to an existing item, whereas customizations involve changing the parameters and attributes of one or items (or views) based on predefined possible customizations. It is noted that customizations may include "display component X or not"—which may make it appear similar to new component addition.

Filters and Search Box

Figure 26:
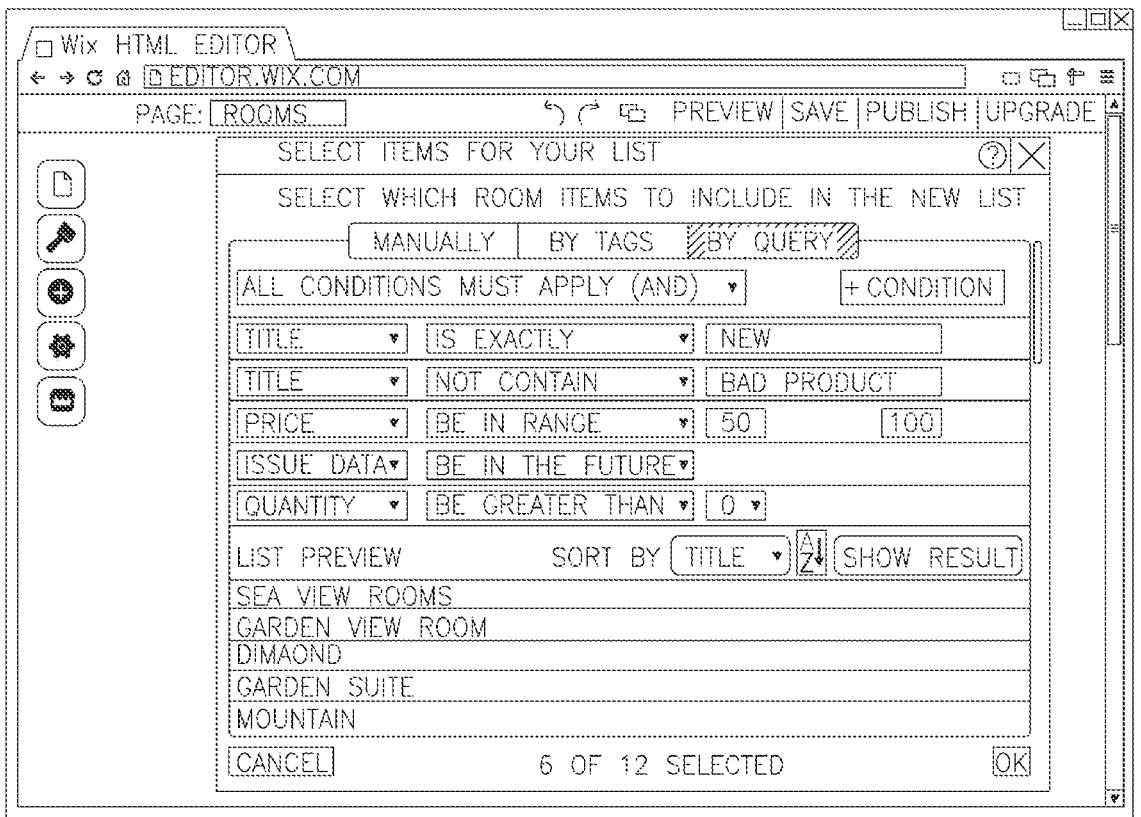
FIG. 26 is an example search box used to select items to be included in a list as generated by the system, in accordance with some demonstrative embodiments of the present invention.

Optionally, a search box creator 197 may enable the designer to specify that a given LC will display a subset of the associated collection items, selected according to given search criteria (e.g., a given query applied to the fields, or other filters). The designer may further specify that such search box would be shown to the end-user when viewing the LC, thereby allowing the end-user to selectively filter or search the displayed content. An example for such search box is shown in FIG. 26.

LC Connections

Figure 20:
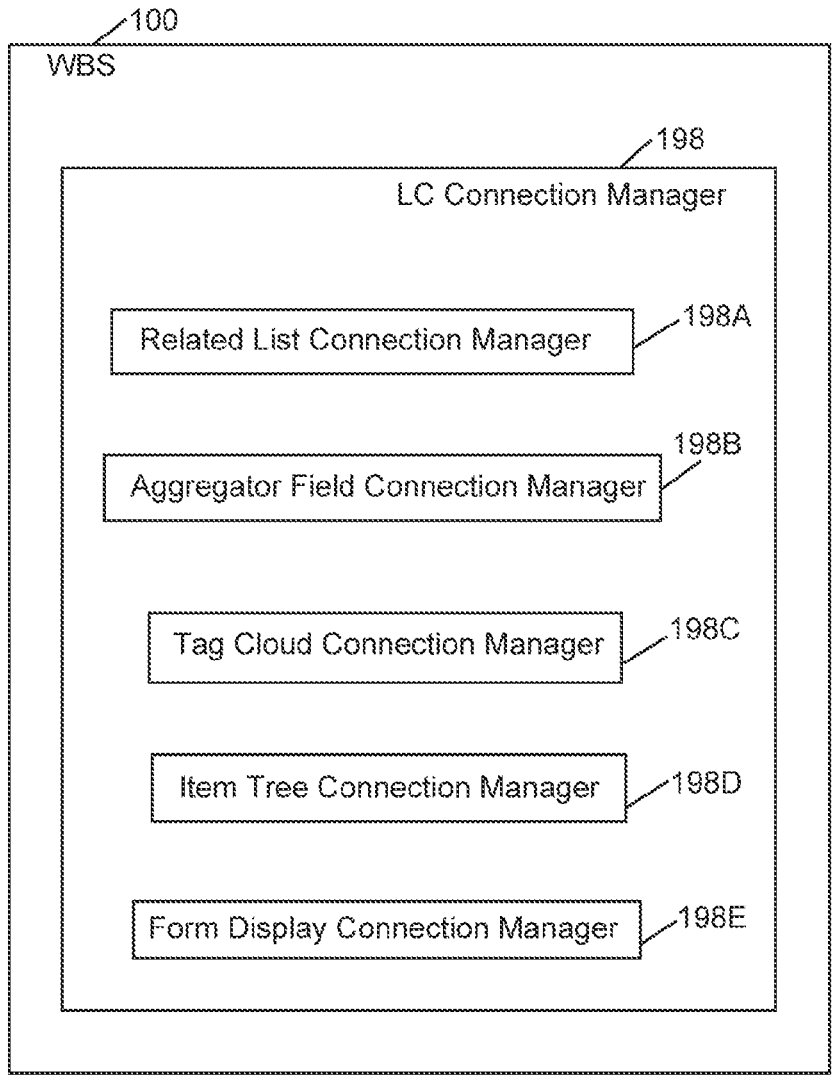
FIG. 20 is a schematic block-diagram illustration of the WBS demonstrating in particular LC connection management, in accordance with some demonstrative embodiments of the present invention.

Reference is made to FIG. 20, which is a schematic block-diagram illustration of WBS 100 demonstrating in particular LC connection management, in accordance with some demonstrative embodiments of the present invention.

For example, an LC connection manager 198 may enable LC's residing in the same page or template to be connected (or inter-connected) in one or more suitable ways. The connected LC's may reside in different containers (or container levels) inside the page. These connections may form a network, such that a particular LC may be connected to multiple other LC's. The LC connection manager 198 may support various types of LC connections, for example, related list connection, aggregator field connection, tag cloud connection, item tree connection, and/or form display connection.

In a related list connection, which may be managed or handled by a related list connection manager 198A, a first LC "A" displays a "master items" collection (e.g., a hotel list); whereas a second LC "B displays a "subordinate items" collection (e.g., guest reviews for each hotel). A pre-specified field in the current item in LC "A" may be used to query the collection being displayed in LC "B" and select the subordinate items. The LC "B" would only display the selected items that match the current item in LC "A". The designer may define additional filtering and/or sorting criteria to query on the subordinate items collection; for example, to select only the first K reviews, to select only reviews which include a specific rating range, or the like. This may be implemented in any suitable manner, including using a full query language (e.g., SQL). A single "master items" LC may be connected to multiple related list LC's; for example, allowing to add a related list display of the ten best reviews and/or the ten worst reviews. This may be achieved using repeater components contained in the view, rather than separate related LC's.

An aggregator field connection, which may be managed or handled by an aggregator field connection manager 198B, may be suitable when a related list connection has been defined. The designer may add a calculated field to the display in master items LC "A" which displays the value of an aggregation function applied to a specific field in the items in the subordinate list. Such aggregation function may include, for example, count, total, average, median, minimum, maximum, or other suitable function.

A tag cloud connection, which may be managed or handled by a tag cloud connection manager 198C, may connect a tag cloud LC to a regular LC, with both LC's being associated with the same collection(s). The tag cloud LC may be automatically filled with tags derived from the existing items in the associated list (or a portion thereof, based on filtering criteria). The user may multi-select a number of tags from the tag cloud LC. The selected tags are used to form a query, which serves as a filter and determines which items are shown in the second LC "B". This may be a private case of "related query LC" (a related LC which is only used for querying).

In an item tree connection, which may be managed or handled by an item tree connection manager 198D the LC may display a sub-hierarchy of items (e.g., an item tree), such as an organizational chart or a family tree. The hierarchy may be defined through the existence of pointer fields in the items, for example, a pointer to parent item, or a set of linked pointers to sibling items. Other than the use of tree-like structure to display mini-pages (each of which containing a view which is used to view an item), the structure may be similar to other carousel-type LC's (which also display multiple items).

In a form display connection, which may be managed or handled by a form display connection manager 198E, an LC [a] may request that a given item [b] be opened in a given secondary LC [c], using either an automatically selected view or a specific view [d]. This may be used, for example, to display an alternative version of an item currently displayed in the LC [a]; such as, to display a detailed version of the same item with a more detailed view, or to display an alternative presentation of the same information (e.g., display location on a pop-up map instead of displaying a textual street address). Similarly, this method may be used to display an "add item" in order to create a new item; or to display an "update item" or "delete item" form.

AppStore Integration

Figure 21:
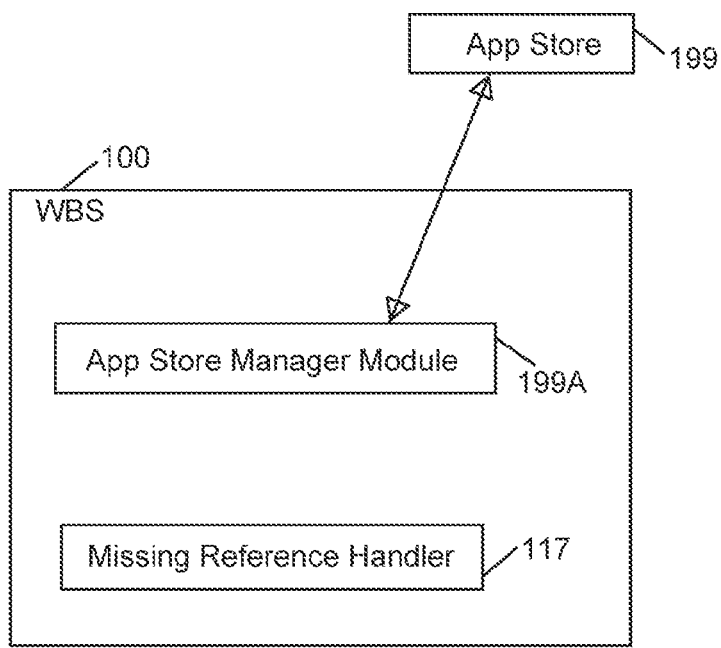
FIG. 21 is a schematic block-diagram illustration of the WBS demonstrating in particular App Store integration, in accordance with some demonstrative embodiments of the present invention.

Reference is made to FIG. 21, which is a schematic block-diagram illustration of WBS 100 demonstrating in particular App Store integration, in accordance with some demonstrative embodiments of the present invention. WBS 100 may comprise, or may be associated with, an Application Store ("App Store") 199, which may be operated or managed via an App Store manager module 199A. Although an external App Store 199 is shown, for demonstrative purposes, it is clarified that App Store 199 may comprise, optionally, one or more application stores which may be operated by the WBS vendor or by third parties, and may be internal or external to WBS 100. A developer at any level (e.g., regular site developer, or a separate third-party developer) may include one or more objects (e.g., depending on the developer's permissions) in an AppStore 199, for purchase and/or downloading by other users. Such objects may include, for example: List applications; Views; Templates (at all levels); Item types; Collections (e.g., selling the access to the collection rather than the collection itself); Components (e.g., particular LC's with their full associations).

The developer may further define or attach icons, marketing material, price, search keywords, and various attributes to the objects offered in the AppStore 199. The offered objects may contain an encapsulated version of other objects required for them; for example, a view object may contain a number of item type objects which may be required for its operation.

The offered objects may optionally reference non-included objects; for example, a list application may rely on a particular view which is not included with it, and such a view would be provided by the including web site. The WBS 100 may utilize a missing reference handler 117 to resolve such missing reference upon inclusion by one or more suitable ways, for example: (a) Automatic resolution by missing reference name and type; (b) requesting the designer to provide explicit resolution; (c) Creating a "draft version" of the missing referenced object, based on the available information (type, name, attribute values) and marking it so the designer would have to complete it later, before publishing. The missing reference handler 117 may also perform a search for likely candidates (e.g., based on similar name, similar properties, specific search attributes) and may provide to the designer a ranked list of possible matches.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments of the present invention may take the form of an entirely hardware embodiment, an entirely software embodiment, or an embodiment including both hardware and software elements. Some embodiments of the present invention may be implemented in software, firmware, resident software, microcode, an application which may be downloaded and/or installed by a user, an application which may run in a browser, a client-side application, a server-side application, a client-server application, or the like. Some embodiments of the present invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system or device. Some embodiments of the present invention may be implemented, for example, using a machine-readable medium or article which may store an instruction or a set of instructions that, if executed by a machine, cause the machine (e.g., a computer or an electronic device) to perform a method and/or operations described herein.

Some embodiments of the present invention may include or may utilize, for example, a processor, a central processing unit (CPU), a digital signal processor (DSP), a controller, an integrated circuit (IC), a memory unit, a storage unit, input units, output units, wired and/or wireless communication units, an operating system, and other suitable hardware components and/or software modules.

Some embodiments may be implemented as, or by utilizing, an application or "app" for a Smartphone or tablet or portable computing device, which may be downloaded and/or installed onto such electronic device from an "app store" or an online marketplace for applications.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A website building system (WBS), the WBS comprising:

at least one processor; and a memory storing instructions that, when executed by the at least one processor, are configured to provide:

a pool of content items to be displayed on a website being built;

a set of views which can be used to display said content items, a view being a template for a section of a web page of said website;

at least two linking components to display items obtained from a collection of said content items through their associated view;

wherein a first of said at least two linking components is a tag cloud linking component to display tags derived from said collection of said content items; and a linking component module to inter-connect said tag cloud linking component and a second linking component, said linking component module to further select content items of the same collection for said second linking component according to a user-selection of tags from said tag cloud linking component for display in said second linking component.

2. The WBS according to claim 1 and further comprising a tag cloud connection manager to provide filtering by query for said user-selection of tags to determine content items for said display in said second linking component.

3. The WBS according to claim 1, wherein user-selection of tags comprises at least two tags.

4. The WBS according to claim 1, wherein said linking component module displays a single mini-page at a time, containing a single content item from said pool of content items.

5. The WBS according to claim 1, wherein said linking component module animates a transition between browsed content items.

6. The WBS according to claim 1, wherein said linking component module displays, concurrently, a gallery of content items.

7. The WBS according to claim 1 and further comprising an aggregator field connection module to inter-connect between two linking components based on an aggregation function which calculates an aggregated value based on content items in one of said two linking components.

8. The WBS according to claim 1, wherein said pool of content items contains at least one item collection updateable via at least one of: a collection updating Application Programming Interface (API), a collection updating web service, an RSS feed, and an interface for collection updating based on external data source.

9. A method for a website building system (WBS), the method comprising:

storing a pool of content items to be displayed on a website being built, a set of views which can be used to display said content items, a view being a template for a section of a web page of said website and at least two linking components to display items obtained from a collection of said content items through its their associated view;

wherein a first of said at least two linking components is a tag cloud linking component to display tags derived from said collection of said content items;

inter connecting said tag cloud linking component and a second linking component, and selecting content items of the same collection for said second linking component according to a user-selection of tags from said tag cloud linking component for display in said second linking component.

10. The method according to claim 9 and further comprising providing filtering by query for said user-selection of tags to determine content items for said display in said second linking component.

11. The method according to claim 9, wherein said user-selection of tags comprises at least two tags.

12. The method according to claim 9, wherein said connecting and said selecting displays a single mini-page at a time, containing a single content item from said pool of content items.

13. The method according to claim 9, wherein said connecting and said selecting animates a transition between browsed content items.

14. The method according to claim 9, wherein said connecting and said selecting displays concurrently, a gallery of content items.

15. The method according to claim 9 and further comprising inter-connecting between two linking components according to an aggregation function which calculates an aggregated value based on content items in one of said two linking components.

16. The method according to claim 9, wherein said pool of content items contains at least one item collection updateable via at least one of: a collection updating Application Programming Interface (API), a collection updating web service, an RSS feed, and an interface for collection updating based on external data source.

* * * * *